(12) United States Patent  (10) Patent No.: US 9,531,531 B2
Avanzi et al.  (45) Date of Patent: Dec. 27, 2016

(54) METHODS AND DEVICES FOR FIXED EXECUTION FLOW MULTIPLIER RECODING AND SCALAR MULTIPLICATION

(71) Applicant: QUALCOMM Incorporated, San Diego, CA (US)

(72) Inventors: Roberto Avanzi, Munich (DE); David Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/705,686

(22) Filed: May 6, 2015

(65) Prior Publication Data

US 2016/0330020 A1  Nov. 10, 2016

(51) Int. Cl.
*H04L 9/00* (2006.01)
*H04L 9/06* (2006.01)
*G06F 7/48* (2006.01)

(52) U.S. Cl.
CPC ........... *H04L 9/0693* (2013.01); *G06F 7/4812* (2013.01)

(58) Field of Classification Search
CPC ............ H04L 9/06; H04L 9/08; H04L 9/3281; H04L 9/0693; G06F 21/76; G06F 7/728; G06F 21/72; G06F 7/4812
USPC ............. 380/28, 44, 255; 713/174, 176, 189
See application file for complete search history.

(56) References Cited

U.S. PATENT DOCUMENTS

| | | | | |
|---|---|---|---|---|
| 6,480,606 B1* | 11/2002 | Kurumatani | ............ | G06F 7/725 380/30 |
| 6,691,143 B2* | 2/2004 | Blaker | .................... | G06F 7/728 708/491 |
| 7,024,559 B1* | 4/2006 | Solinas | ................. | H04L 9/3252 713/180 |
| 7,864,951 B2* | 1/2011 | Al-Gahtani | ............. | H04L 9/003 380/255 |

(Continued)

FOREIGN PATENT DOCUMENTS

WO  WO-2007005563 A2  1/2007
WO  WO-2008106789 A1  9/2008

OTHER PUBLICATIONS

Moller B., "Securing Elliptic Curve Point Multiplication Against Side-Channel Attacks", ISC 2001, 2001, pp. 324-334.

(Continued)

*Primary Examiner* — Hosuk Song
(74) *Attorney, Agent, or Firm* — Loza & Loza, LLP

(57) ABSTRACT

One feature pertains to an electronic device that includes a memory circuit and a processing circuit. The processing circuit computes a scalar multiplication output Z where $Z=k\cdot P$ by receiving an input multiplier k and a base P, and adds a modifier s to the input multiplier k to generate k'. The processing circuit also computes an intermediate scalar multiplication output Z' where $Z'=k'\cdot P$ by using a digit expansion of k' that includes a sequence of digits $k_i$ belonging to a digit set D. Additionally, the processing circuit subtracts $s\cdot P$ from Z' to obtain the scalar multiplication output Z if k' is odd or subtracts $(s+1)\cdot P$ from Z' to obtain the scalar multiplication output Z if k' is even. The scalar multiplier output Z may be used in a cryptographic security algorithm to secure data.

50 Claims, 14 Drawing Sheets

(56) References Cited

U.S. PATENT DOCUMENTS

| | | | |
|---|---|---|---|
| 7,940,927 B2* | 5/2011 | Futa | ..................... G06F 7/725 380/255 |
| 2013/0346461 A1 | 12/2013 | Fischer | |
| 2014/0334621 A1 | 11/2014 | Abarzua et al. | |

OTHER PUBLICATIONS

Theriault N, "SPA Resistant Left-To-Right Integer Recordings", Selected Areas in Cryptography, 2005, pp. 345-358.
Chen C.N., "Exponentiation Algorithm with Immunity against Side-Channel Attack," Jul. 27, 2010, 130 Pages.
Longa P., et al., "Four-Dimensional Gallant-Lambert-Vanstone Scalar Multiplication," 2012, 32 pages.
International Search Report and Written Opinion—PCT/US2016/028875—ISA/EPO—Jul. 1, 2016.
Joye M., et al., "Highly Regular Right-to-Left Algorithms for Scalar Multiplication", Sep. 10, 2007 (Sep. 10, 2007), Cryptographic Hardware and Embedded, Systems—CHES 2007, [Lecture Notes in Computer Science], Springer Berlin Heidelberg, Berlin, Heidelberg, pp. 135-147, XP047030351, ISBN: 978-3-540-74734-5, Algorithm 2.

\* cited by examiner

| Digit Set Value | Precomputed Value Stored in Table |
|---|---|
| $d_0$ | $d_0 \cdot P$ |
| $d_1$ | $d_1 \cdot P$ |
| $m$ | $m \cdot P$ |
| $d_2$ | $d_2 \cdot P$ |
| ... | ... |
| $d_{l-1}$ | $d_{l-1} \cdot P$ |
| $d_l$ | $d_l \cdot P$ |

METHODS AND DEVICES FOR FIXED EXECUTION FLOW MULTIPLIER RECODING AND SCALAR MULTIPLICATION

BACKGROUND

Field

Various features generally relate to cryptographic security, and more particularly to methods and devices for fixed execution flow multiplier recoding and scalar multiplication used in cryptographic security algorithms.

Background

Elliptic curve point multiplication, and in general multiplication by a constant in a cyclic group with g elements, is a calculation that accepts a multiplier k (with k≥0) and a base P, and computes the result:

$$k \cdot P = \underbrace{P + P + \ldots + P}_{k \text{ summands}}.$$

This operation is called scalar multiplication, and it is a fundamental operation in many cryptographic protocols, for instance Diffe-Hellman key-exchange and generating digital signatures.

Generally, k·P may be calculated by first writing out the multiplier k as $k = \Sum_{i=0}^{l} k_i 2^i$ where $k_i$ are elements of a integer digit set D. First, let there be a Z that is initialized to the additive identity, which for elliptic curves is called the point at infinity. Next, the digits $k_i$ of k are examined from most significant to least significant. For a digit $k_i$, if 0 then Z:=2*Z. If $k_i \neq 0$, then Z:=2*Z+$k_i$*P. When all the bits have been processed the result is the then current value of Z. However, methods utilizing such expansions are susceptible to side-channel analysis attacks and timing analysis attacks because the sequence of zero and non-zero digits is not regular thereby leaking some information about the multiplier k.

A prior art method developed by Nicholas Theriault reduces the risk of side-channel analysis and timing analysis. Nicholas Theriault, *SPA Resistant Left-to-Right Integer Recodings, Selected Areas in Cryptography* (2005): pages 345-358. Theriault expands the multiplier k as the expansion $k = \Sum_{i=0}^{l} k_i 2^{wi}$ where w is a window length parameter and $k_i$ is chosen from one of two sets of integers:

Digit Set #1: $\{\pm 1\} \cup \{\pm 2, \pm 4, \ldots, \pm 2^w\}$ for a window w;
Digit Set #2: $\{\pm 1, \pm 3, \pm 5, \ldots, \pm 2^w - 1\}$ for a window w.

Theriault's method has some notable disadvantages though. First, Digit Set #2 can only expand odd digits. Consequently, Theriault suggests to use this multiplier expansion with groups of odd order and if the original multiplier k is even, to add an odd multiple of the group order g so that a new multiplier k'=k+n*g is odd. This has the drawback that it makes the multiplier longer, and therefore the scalar multiplication slower. Second, since k'>g, one of the intermediate computations may turn out to be equal to g·P. This leads to an exceptional case in the formula to compute with elliptic curves, the result being that this occurrence leaks information and may be detected by means of side-channel attacks.

Third, computing the multiplier expansion using Digit Set #2 will yield a carry of 0 or 1, which requires an extra operation or a dummy operation to fix the result. However, an extra operation would be detectable by means of side-channel attacks, and a dummy operation would be detectable by means of fault attacks. Thus, in both cases information is leaked and the parity of the multiplier may be revealed.

Accordingly, there is a need for methods and devices that can execute scalar multiplication in a time and memory efficient manner that are also resistant to side-channel attacks and fault attacks.

SUMMARY

One feature provides an electronic device comprising a memory circuit and a processing circuit communicatively coupled to the memory circuit. The processing circuit is adapted to compute a scalar multiplication output Z where Z=k·P by receiving an input multiplier k and a base P, adding a modifier s to the input multiplier k to generate k', wherein the same modifier s is added to the input multiplier k to generate k' regardless of whether k is odd or even, computing an intermediate scalar multiplication output Z' where Z'=k'·P by using a digit expansion of k' that includes a sequence of digits $k_i$ belonging to a digit set D, and subtracting s·P from Z' to obtain the scalar multiplication output Z if k' is odd or subtracting (s+1)·P from Z' to obtain the scalar multiplication output Z if k' is even, and wherein the scalar multiplier output Z is used in a cryptographic security algorithm to secure data. According to one aspect, the digit expansion of k' is based on $k' = \Sum_{i=0}^{l} k_i 2^{wi} - c$, and the sequence of digits $k_i$ are from the digit set D=$\{\pm 1, \pm 3, \pm 5, \ldots, \pm 2^w - 1\}$, w is an integer value greater than or equal to one (1), and c equals 0 or 1. According to another aspect, the modifier s equals one (1) or two (2).

According to one aspect, computing the intermediate scalar multiplication output Z' includes initializing a carry value c equal to zero (0), and determining a digit sequence ($k_l$, $k_{l-1}$, ..., $k_1$, $k_0$) by performing for all integer values i=l down to i=0 the operations:

$k_i := k_i - 2^w c$;
if $k_i$ is even:
  $k_i := k_i + 1$;
  c:=1;
else:
  c:=0.

According to another aspect, computing the intermediate scalar multiplication output Z' further includes one of initializing Z' as Z'=$k_l$·P, and performing, for i=l−1 down to i=0, operations:

Z'=2·Z' a number of times equal to w;
Z'=Z'+$k_i$·P; or
initializing Z' as Z'=0, and performing, for i=l down to i=0, operations:

Z'=2·Z' a number of times equal to w;
Z'=Z'+$k_i$·P.

According to yet another aspect, the processing circuit is further adapted to precompute at least one of a plurality of values d·P and/or −d·P for all values |d| where |d|∈D, and store the precomputed plurality of values d·P and/or −d·P in the memory circuit.

According to one aspect, the operation Z'=Z'+$k_i$·P is performed by retrieving $k_i$·P from the precomputed plurality of values d·P and/or −d·P stored in the memory circuit. According to another aspect, a digit set D includes a plurality of integer values $\{d_0, d_1, \ldots, d_n\}$, and the processing circuit is further adapted to precompute and store a plurality of values $d_i$·P for i=0 to i=n. According to yet another aspect, the processing circuit is further adapted to precompute and store m·P for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$. According to another aspect, computing the intermediate scalar multiplication output Z' includes initializing a carry value c equal to zero (0), and determining, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
c:=1−LSB($k_i$);
$k_i = k_i + c$.

Another feature provides a method for computing a scalar multiplication output Z where Z=k·P, the method comprising receiving an input multiplier k and a base P, adding a modifier s to the input multiplier k to generate k', wherein the same modifier s is added to the input multiplier k to generate k' regardless of whether k is odd or even, computing an intermediate scalar multiplication output Z' where Z'=k'·P by using a digit expansion of k' that includes a sequence of digits $k_i$ belonging to a digit set D, and subtracting s·P from Z' to obtain the scalar multiplication output Z if k' is odd or subtracting (s+1)·P from Z' to obtain the scalar multiplication output Z if k' is even, and wherein the scalar multiplier output Z is used in a cryptographic security algorithm to secure data. According to one aspect, computing the intermediate scalar multiplication output Z' includes initializing a carry value c equal to zero (0), and determining, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
if $k_i$ is even:
 $k_i := k_i + 1$;
 c:=1;
else:
 c:=0.

According to another aspect, computing the intermediate scalar multiplication output Z' further includes initializing Z' as Z'=$k_l$·P, and performing, for i=l−1 down to i=0, operations:

Z'=2·Z' a number of times equal to w;
Z'=Z'+$k_i$·P.

According to one aspect, the method further comprises precomputing at least one of a plurality of values d·P and/or −d·P for all values |d| where |d|∈D, and storing the precomputed plurality of values d·P and/or −d·P in a memory circuit. According to another aspect, the operation Z'=Z'+$k_i$·P is performed by retrieving $k_i$·P from the precomputed plurality of values d·P and/or −d·P stored in the memory circuit. According to yet another aspect, a digit set D includes a plurality of integer values $\{d_0, d_1, \ldots, d_n\}$, and the method further comprises precomputing and storing a plurality of values $d_i$·P for i=0 to i=n.

According to one aspect, the method further comprises precomputing and storing m·P for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$. According to another aspect, computing the intermediate scalar multiplication output Z' includes initializing a carry value c equal to zero (0), and determining, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
c:=1−LSB($k_i$);
$k_i = k_i + c$.

Another feature provides an electronic device adapted to compute a scalar multiplication output Z where Z=k·P, and the electronic device comprises means for receiving an input multiplier k and a base P, means for adding a modifier s to the input multiplier k to generate k', wherein the same modifier s is added to the input multiplier A to generate k' regardless of whether k is odd or even, means for computing an intermediate scalar multiplication output Z' where Z'=k'·P by using a digit expansion of k' that includes a sequence of digits $k_i$ belonging to a digit set D, and means for subtracting s·P from Z' to obtain the scalar multiplication output Z if k' is odd or means for subtracting (s+1)·P from Z' to obtain the scalar multiplication output Z if k' is even, and wherein the scalar multiplier output Z is used in a cryptographic security algorithm to secure data. According to one aspect, the means for computing the intermediate scalar multiplication output Z' includes means for initializing a carry value c equal to zero (0), and means for determining, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
if $k_i$ is even:
 $k_i := k_i + 1$;
 c:=1;
else:
 c:=0.

According to another aspect, means for computing the intermediate scalar multiplication output Z' further includes means for initializing Z' as Z'=$k_l$·P, and means for performing, for i=l−1 down to i=0, operations:

Z'=2·Z' a number of times equal to w;
Z'=Z'+$k_i$·P.

According to one aspect, the electronic device further comprises means for precomputing at least one of a plurality of values d·P and/or −d·P for all values |d| where |d|∈D; and means for storing the precomputed plurality of values d·P and/or −d·P in a memory circuit. According to another aspect, the operation Z'=Z'+$k_i$·P is performed by means for retrieving $k_i$·P from the precomputed plurality of values d·P and/or −d·P stored in the memory circuit. According to yet another aspect, a digit set D includes a plurality of integer values $\{d_0, d_1, \ldots, d_n\}$, and the electronic device further comprises means for precomputing and means for storing a plurality of values $d_i$·P for i=0 to i=n.

According to one aspect, the electronic device further comprises means for precomputing and means for storing m·P for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$. According to another aspect, the means for computing the intermediate scalar multiplication output Z' includes means for initializing a carry value c equal to zero (0), and means for determining, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
c:=1−LSB($k_i$);
$k_i = k_i + c$.

A computer-readable storage medium adapted to store one or more instructions for computing a scalar multiplication output Z where Z=k·P, the instructions which when executed by at least one processor causes the processor to receive an input multiplier k and a base P, add a modifier s to the input multiplier k to generate k', wherein the same modifier s is added to the input multiplier k to generate k' regardless of whether k is odd or even, compute an intermediate scalar multiplication output Z' where Z'=k'·P by using a digit expansion of k' that includes a sequence of digits $k_i$ belonging to a digit set D, and subtract s·P from Z' to obtain the scalar multiplication output Z if k' is odd or subtract (s+1)·P from Z' to obtain the scalar multiplication output Z if k' is even, and wherein the scalar multiplier output Z is used in a cryptographic security algorithm to secure data. According to one aspect, the instructions for causing the processor to compute the intermediate scalar multiplication output Z' further include instructions for causing the processor to initialize a carry value c equal to zero (0), and determine, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
if $k_i$ is even:
$k_i := k_i + 1$;
c:=1;
else:
c:=0.

According to another aspect, the instructions for causing the processor to compute the intermediate scalar multiplication output Z' further include instructions for causing the processor to initialize Z' as $Z' = k_l \cdot P$, perform, for i=l−1 down to i=0, operations:

$Z' = 2 \cdot Z'$ a number of times equal to w;
$Z' = Z' + k_i \cdot P$.

According to one aspect, the instructions which when executed by the at least one processor further causes the processor to precompute at least one of a plurality of values d·P and/or −d·P for all values |d| where |d|∈D, and store the precomputed plurality of values d·P and/or −d·P in a memory circuit. According to another aspect, the instructions which when executed by the at least one processor further causes the processor to retrieve $k_i \cdot P$ from the precomputed plurality of values d·P and/or −d·P stored in the memory circuit to execute the operation $Z' = Z' + k_i \cdot P$. According to yet another aspect, a digit set D includes a plurality of integer values $\{d_0, d_1, \ldots, d_n\}$, and the instructions which when executed by the at least one processor further causes the processor to precompute and store a plurality of values $d_i \cdot P$ for i=0 to i=n.

According to one aspect, the instructions which when executed by the at least one processor further cause the processor to precompute and store m·P for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$. According to another aspect, the instructions for causing the processor to compute the intermediate scalar multiplication output Z' further include instructions for causing the processor to initialize a carry value c equal to zero (0), and determine, for a window length value w equal to or greater than one (1), a digit sequence $(k_l, k_{l-1}, \ldots, k_1, k_0)$ by performing for all integer values i=l down to i=0 the operations:

$k_i := k_i - 2^w c$;
$c := 1 - LSB(k_i)$;
$k_i := k_i + c$.

Another feature provides an integrated circuit comprising a memory circuit, and a processing circuit communicatively coupled to the memory circuit, the processing circuit adapted to compute a scalar multiplication output Z where Z=k·P by receiving an input multiplier k and a base P, adding a modifier s to the input multiplier k to generate k', wherein the same modifier s is added to the input multiplier k to generate k' regardless of whether k is odd or even, computing an intermediate scalar multiplication output Z' where Z'=k'·P by using a digit expansion of k' that includes a sequence of digits $k_i$ belonging to a digit set D, and subtracting s·P from Z' to obtain the scalar multiplication output Z if k' is odd or subtracting (s+1)·P from Z' to obtain the scalar multiplication output Z if k' is even, and wherein the scalar multiplier output Z is used in a cryptographic security algorithm to secure data. According to one aspect,

DETAILED DESCRIPTION

In the following description, specific details are given to provide a thorough understanding of the various aspects of the disclosure. However, it will be understood by one of ordinary skill in the art that the aspects may be practiced without these specific details. For example, circuits and structures may be shown in block diagrams in order to avoid obscuring the aspects in unnecessary detail. In other instances, well-known circuits, structures and techniques may not be shown in detail in order not to obscure the aspects of the disclosure. The word "exemplary" is used herein to mean "serving as an example, instance, or illustration." Any implementation or aspect described herein as "exemplary" is not necessarily to be construed as preferred or advantageous over other aspects of the disclosure.

Overview

Some methods and devices described herein pertain to computing a scalar multiplication output Z where Z=k·P. The methods and devices receive an input multiplier k and a base P, and add a modifier s to the input multiplier k to generate k', where the same modifier s is added to the input multiplier k to generate k' regardless of whether k is odd or even. The methods and devices also compute an intermediate scalar multiplication output Z' where Z'=k'·P by using a digit expansion of k' that includes a sequence of digits $k_i$ belonging to a digit set D. According to one example, the digit set D={±1, ±3, ±5, ±7, ±9, ±11, =13, ±15}. Additionally, the methods and devices subtract s·P from Z' to obtain the scalar multiplication output Z if k' is odd or subtract (s+1)·P from Z' to obtain the scalar multiplication output Z if k' is even. The scalar multiplier output Z may be used in a cryptographic security algorithm to secure data.

Figure 1:
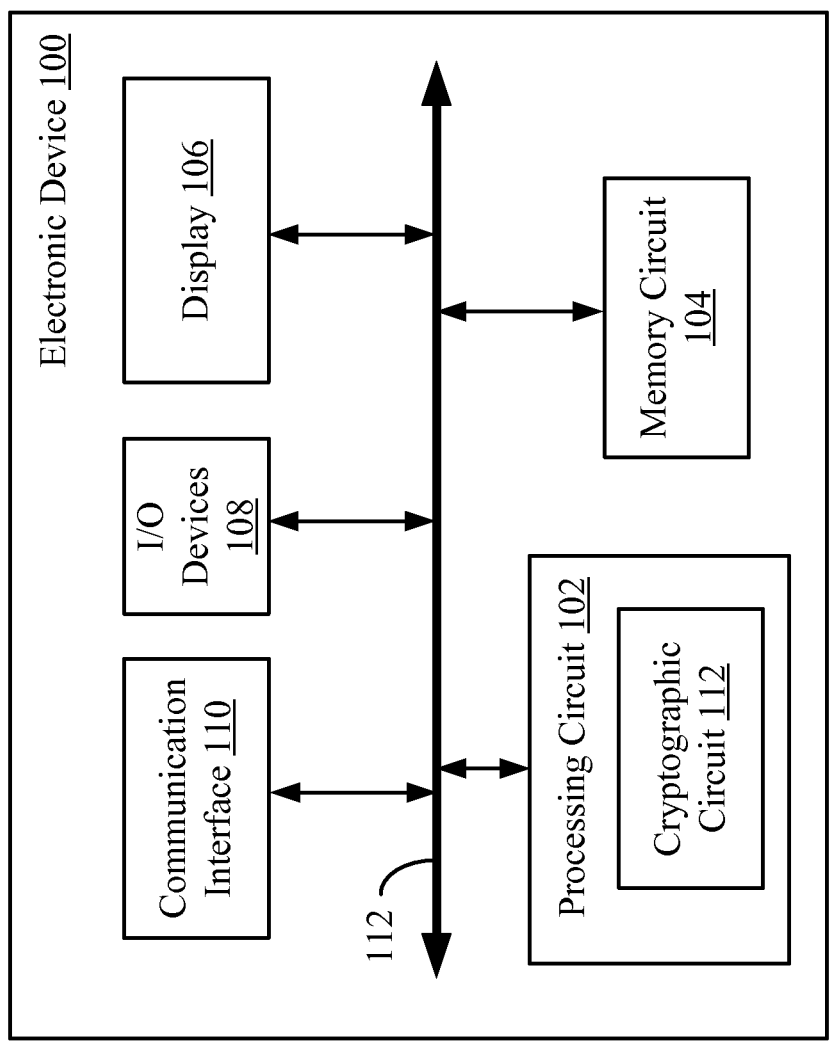
FIG. 1 illustrates a schematic block diagram of an electronic device.

Exemplary Method for Fixed Execution Flow Multiplier Recoding and Scalar Multiplication FIG. 1 illustrates a schematic block diagram of an electronic device 100 according to one aspect of the disclosure. The electronic device 100 may be any electronic device including, but not limited to, a wireless communication device, a tablet, a smartphone, cable television set-top box, a laptop, a desktop computer, a smartwatch, wearable optical head-mounted displays, a server, etc. The electronic device 100 may include at least one processing circuit 102 (processor, central processing unit (CPU), applications processing unit (APU), etc.), at least one memory circuit 104, at least one display 106, I/O devices 108, and/or at least one communication interface 110. These components 102, 104, 106, 108, 110 may be communicatively coupled to one another, for example, by a communication bus 112.

The processing circuit 102 may generally execute software and instructions stored in the memory circuit 104. The processing circuit 102 may also include a cryptographic circuit 112 that executes cryptographic security algorithms. For example, the cryptographic circuit 112 may generate cryptographic security keys (e.g., symmetrical keys, asymmetrical public-private key pairs, etc.), generate cryptographic digital signatures, authenticate or verify digital signatures and/or certificates, etc. As will be explained in greater detail below, performing one or more of the aforementioned cryptographic security algorithms may cause the cryptographic circuit 112 to execute fast, memory efficient, secure, and robust algorithms for scalar multiplication.

The memory circuit 104 may include volatile and non-volatile memory, and may store software and instructions that are executed by the processing circuit 102. For example, the memory circuit 104 may store instructions associated with performing any of the cryptographic security algorithms and/or processes described herein.

The display 106 may be any display device including, but not limited to, liquid crystal displays (LCD), plasma screens, flat panel monitors, and/or a touchscreen display. For example, it may be the display on a smartphone, a table, a laptop, a smartwatch, etc. The I/O devices 108 may include, among other things, a keyboard, a mouse, a touchscreen display, status indicator lights, speakers, and/or buttons.

The communication interface 110 may allow for short range and/or long range communication with other electronic devices. For example, the communication interface 110 may include one or more wireless communication interfaces. Such wireless communication interfaces may allow for short range or long range communication protocols including, but not limited to, Wi-Fi®, cellular communications, Zigbee®, Bluetooth®, etc. The communication interface 110 may also allow for wired communication with other electronic devices, for example, both directly and/or through one or more communication networks.

Figure 2:
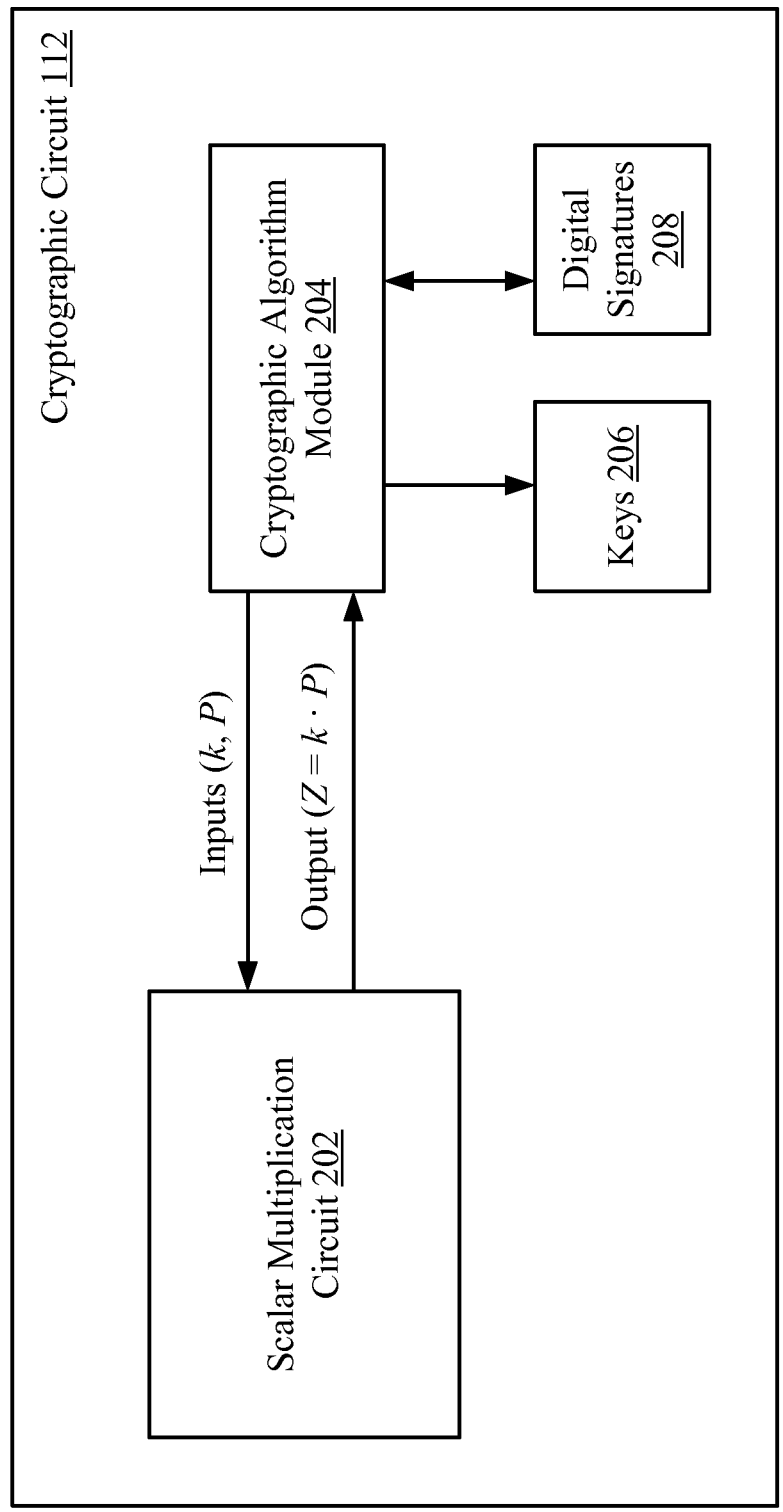
FIG. 2 illustrates an exemplary block diagram of the cryptographic circuit.

FIG. 2 illustrates an exemplary block diagram of the cryptographic circuit 112 according to one aspect of the disclosure. The cryptographic circuit 112 may include a scalar multiplication circuit 202 and a cryptographic algorithm module 204. The cryptographic module 204 may execute a variety of cryptographic algorithms including, but not limited to, key generation functions that generate keys 206 and digital signature functions that generate and/or authenticate/verify digital signatures 208. As explained in greater detail below, the scalar multiplication circuit 202 may receive input parameters and provide an output value. Specifically, the scalar multiplication circuit 202 may receive an input multiplier k and a base P and provide an elliptic curve point multiplication output Z=k·P. The scalar multiplication circuit 202 executes the operation k·P using a digital circuit in a fast, memory efficient, secure, and robust manner as described herein.

Figure 3:
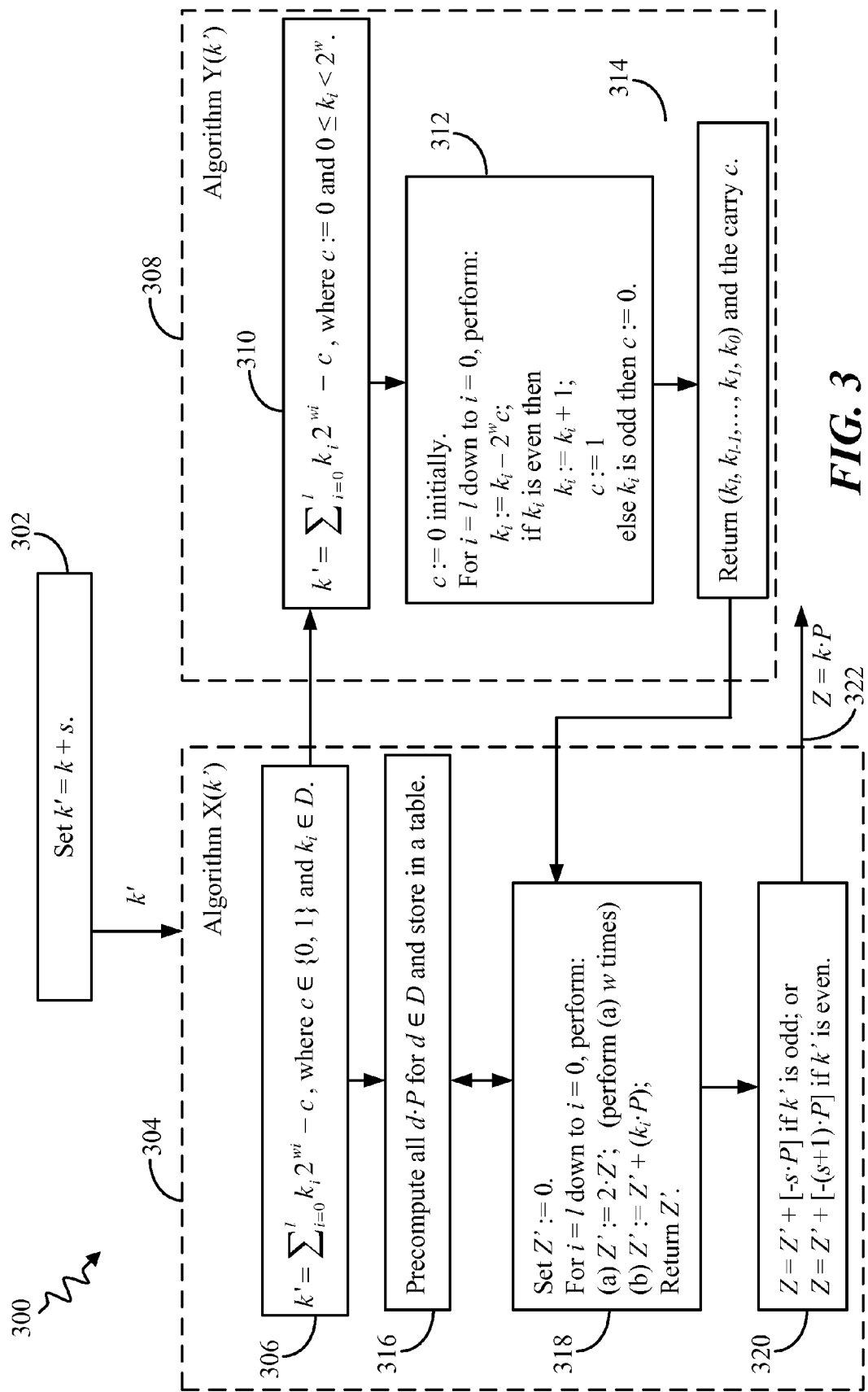
FIG. 3 illustrates an algorithm executed at the scalar multiplication circuit.

FIG. 3 illustrates an algorithm 300 executed at the scalar multiplication circuit 202 (see FIG. 2) according to one aspect. Referring to FIG. 3, a fixed, non-zero integer value s is added 302 to the input multiplier k to yield k'. Thus, k'=k+s. The adjusted multiplier k' is then input to a first algorithm (e.g., Algorithm X) 304 that ultimately outputs k·P. According to Algorithm X 304, $k'=\Sigma_{i=0}^{l} k_i 2^{wi} - c$, where $c \in \{0, 1\}$, the values $k_i$ are from a digit set D 306 (i.e., $k_i \in D$), and the value l is equal to the number of digits in $k_i$. According to one example, the digit set D={±1, ±3, ±5, . . . , ±$2^w$−1} and w≥1. The expansion $k'=\Sigma_{i=0}^{l} k_i 2^{wi} - c$ 306 may be computed using a second algorithm (e.g., Algorithm Y) 308.

For Algorithm Y 308, $k'=\Sigma_{i=0}^{l} k_i 2^{wi} - c$ with each integer $k_i$ satisfying $0 \le k_i < 2^w$ and c is initially set equal to 0, and thus $k'=\Sigma_{i=0}^{l} k_i 2^{wi}$ 310. Then, for i=l down to 0 the following is performed 312:

$k_i := k_i - 2^w c$;
if $k_i$ is even:
 $k_i := k_i + 1$;
 c:=1;
else:
 c:=0

This operation 312 may be performed branchless as c:=1−LSB($k_i$) and $k_i := k_i + c$. The operation LSB($k_i$) returns the least significant bit of $k_i$. Next, the digit sequence ($k_l$, $k_{l-1}$, . . . , $k_1$, $k_0$) and the carry c is returned 314.

Returning to Algorithm X 304, d·P for all d∈D is precomputed 316 and stored in a table. If both d and −d are in the digit set D, then simply d·P is precomputed and stored and −d·P can be trivially derived from d·P. Next, Z' may be set to the identity element as Z'=0. Then, for i=l down to i=0 the following is performed 318:

execute w times the doubling operation Z':=2·Z';
 Z':=Z'+($k_i$·P).

where $k_i$·P is either retrieved from the table or computed on the fly from −$k_i$·P if the latter is stored in the table, which then returns Z'. The operation 318 may be equivalently performed by first initializing Z' to Z':=$k_l$·P, and then for i=l−1 down to i=0 performing:

execute w times the doubling operation Z':=2·Z';
 Z':=Z'+($k_i$·P).

The value Z' is then used to compute Z=k·P. This may be done by simply adding −(s·P) to Z' to obtain Z if k' is odd or by adding −((s+1)·P) to Z' to obtain Z if k' is even 320. That is, s·P is subtracted from Z' to obtain Z if k' is odd or (s+1)·P is subtracted from Z' to obtain Z if k' is even. The output 322 of Algorithm X 304 is thus Z=k·P. As one example, if s=1, then −P is added to Z' to obtain Z if k' is odd, and −2P is added to Z' to obtain Z if k' is even. As another example, if s=2, then −2P is added to Z' to obtain Z if k' is odd, and −3P is added to Z' to obtain Z if k' is even.

Notably, adding the modifier s to k in the above algorithm ensures that regardless of whether k is even or odd a subtraction operation is performed at the end of the algorithm 300 to obtain Z=k·P. Thus, the sequence of mathematical operations of the algorithm 300 for a given value of w will be: double the current value of Z'w times and add $k_i$·P, double the current value of Z'w times and add $k_i$·P, . . . , double the current value of Z'w times and add $k_i$·P, and subtract s·P or (s+1)·P. In other words, the sequence of mathematical operations is double w times then add, double w times then add, . . . , and lastly subtract (i.e., add). The last subtraction operation is an "effective operation" in that it has an actual effect on the output value of the algorithm 300 and is not a "dummy operation."

By contrast, if no modifier s is added to k (e.g., Theriault's prior art method) and k is odd, then the algorithm concludes without needing a final subtraction/addition operation, and if k is even, then a final subtraction/addition operation is needed to correct the result. This means that one sequence of operations (double w times and add, double w times and add, . . . , double w times and add) is needed when k is odd and a different sequence of operations (double w times and add, double w times and add, . . . , double w times and add, add/subtract) is needed when k is even. Differences in operations can be used in side channel attacks to deduce and reveal information about the value of k. Even if a dummy add/subtract operation is used at the end of Theriault's algorithm when k is odd, such a dummy operation has no effect on the final output value of the algorithm and is consequently insecure against fault attacks.

Furthermore, the same modifier value s is added to k to obtain k' regardless of whether k is odd or even. Consequently, a different value (e.g., either (s·P) or ((s+1)·P)) is subtracted from Z' to obtain Z depending on whether k' is odd or even. According to one aspect of the disclosure, a different value s may be added to each multiplier value k received at the scalar multiplication circuit 202. Thus, as one non-limiting, non-exclusive example, s=1 may be used for a first multiplier value $k_A$ received and a different value s=2 may be used for another subsequent multiplier value $k_B$ received.

Figure 4A:
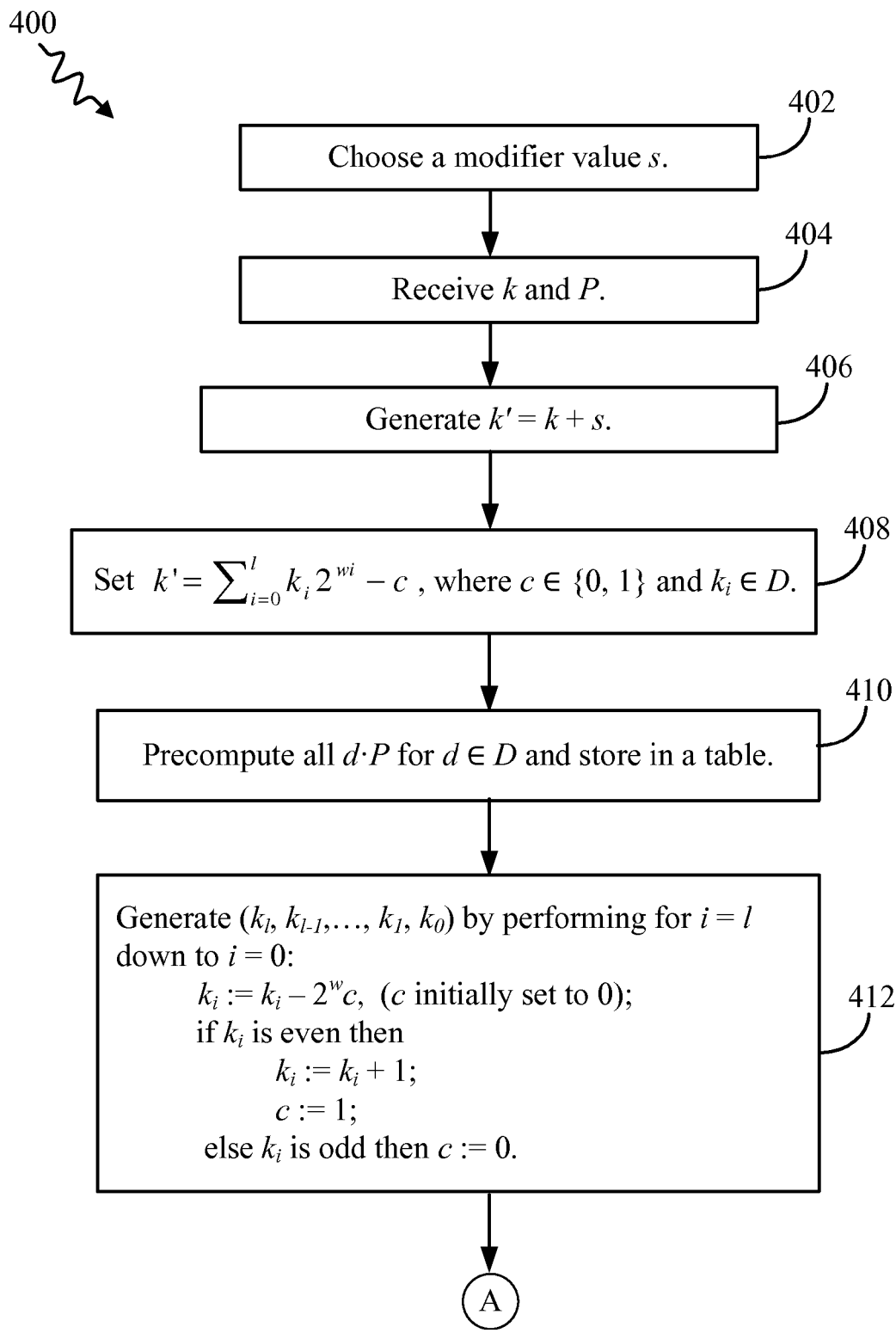
FIGS. 4A and 4B illustrates a flow diagram of a method that may be executed at the scalar multiplication circuit.
Figure 4B:
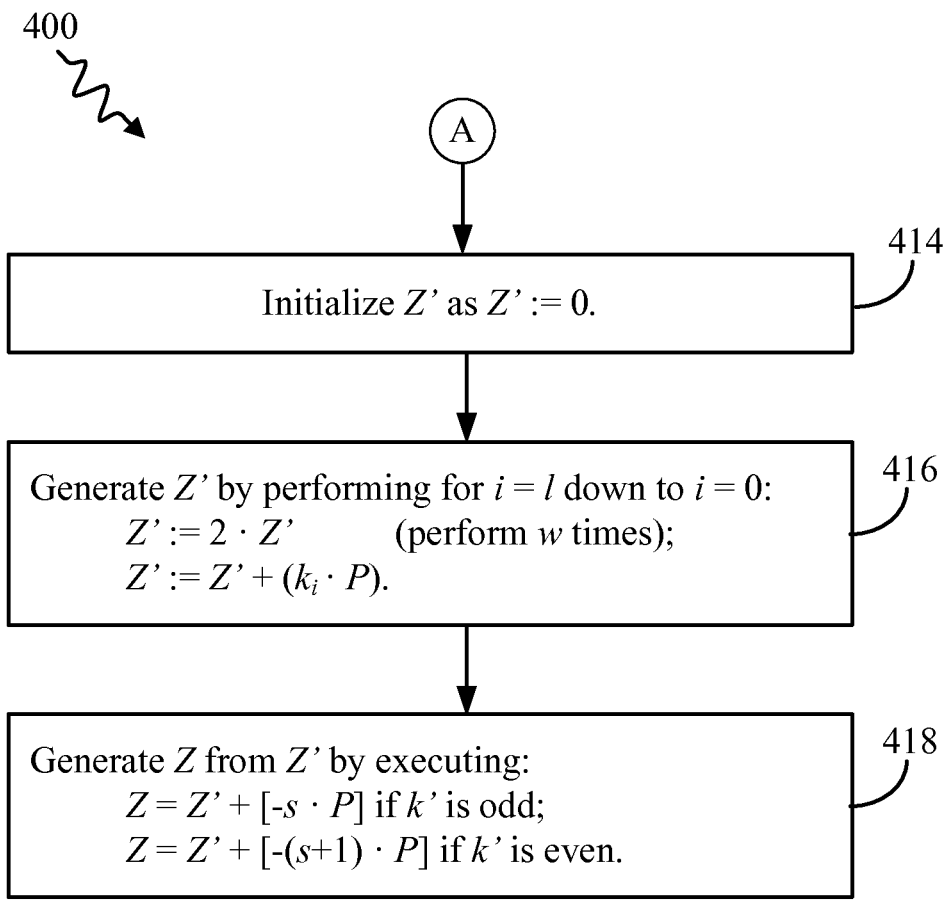

FIGS. 4A and 4B illustrates a flow diagram of a method 400, according to one aspect, that may be executed at the scalar multiplication circuit 202 (see FIG. 2). Referring to FIG. 4A, a modifier value s may be selected 402. Next, an input multiplier k is received 404 along with a base P. Then, an adjusted multiplier value k' is generated by adding 406 the modifier value s to the multiplier k. Thus, k'=k+s. The same modifier value s is added to k regardless of whether k is even or odd. Next, the adjusted modifier k' is written/set 408 as an expansion according to equation (1):

$$k' = \sum_{i=0}^{l} k_i 2^{wi} - c \tag{1}$$

where $c \in \{0, 1\}$ and the values $k_i$ are from a digit set D (i.e., $k_i \in D$). According to one example, the digit set D={±1, ±3, ±5, . . . , ±$2^w$−1}. Then, a plurality of values d·P are precomputed 410 and stored in a table where d∈D. According to one aspect, only either d·P or −d·P is precomputed and stored for each value |d| since −d·P may be trivially determined from d·P and d·P may be trivially determined from −d·P on the fly as needed.

Figure 5:
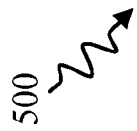
FIG. 5 illustrates an exemplary precomputed table storing values d·P.

FIG. 5 illustrates an exemplary precomputed table 500 storing values d·P. In the example shown, it may be assumed that the digit set D includes a plurality of integer values {$d_0$, $d_1$, . . . , $d_n$}. The table 500 then stores a plurality of values $d_i$·P for i=0 to i=n. The table 500 may also store m·P for at least one integer intermediate value m where m is greater than the smallest value in the digit set D and less than the greatest value in the digit set D. According to one aspect, the modifier values s and s+1 may both be in the set {$d_0$, $d_1$, . . . , $d_n$}∪{m}. Thus, s and s+1 may be negative or positive but are not zero (0). However, the case where s and s+1 are negative values may generate k'≤0. Precautions should be taken to ensure this cannot occur. Moreover, having negative values for s and s+1 may be impractical for use in protocols, such as elliptic curve digital signature algorithm (ECDSA), where the range of k cannot be restricted to k>s.

Referring back to FIG. 4A, a plurality of values ($k_l$, $k_{l-1}$, . . . , $k_1$, $k_0$) are generated by performing/executing 412 for i=l down to i=0 where c is initially set equal to 0:

$k_i := k_i - 2^w c$;
if $k_i$ is even:
   $k_i := k_i + 1$;
   c:=1;
else:
   c:=0.

The window value w is an integer value equal to or greater than one (1). This operation 412 may be performed branchless as (c initially set equal to 0):

$k_i := k_i - 2^w c$;
c:=1−LSB($k_i$);
$k_i := k_i + c$.

Referring to FIG. 4B, an intermediate output value Z'=k'·P is next calculated by first initializing 414 Z' to the identity element of the group (e.g., Z'=0). Then, for each of i=l down to i=0 the following operations are performed 416:

w times do: Z':=2·Z' (i.e., double the value Z'w times);
Z':=Z'+$k_i$·P.

For each value of i the value $k_i$·P is retrieved from the table (e.g., table 500 in FIG. 5) that stores the plurality of values d·P or is derived from such table values. Equivalently, Z' may be initialized to Z'=$k_l$·P ($k_l$·P may also be retrieved from the table 500), and then for each value of i=l−1 down to i=0 the following operations are performed 416:

w times do: Z':=2·Z' (i.e., double the value Z'w times);
Z':=Z'+$k_i$·P.

Finally, the output value Z is determined from the intermediate output value Z' by executing 418:

Z=Z'+[s·P] if k' is odd; and
Z=Z'+[(s+1)·P] if k' is even.

Figure 6A:
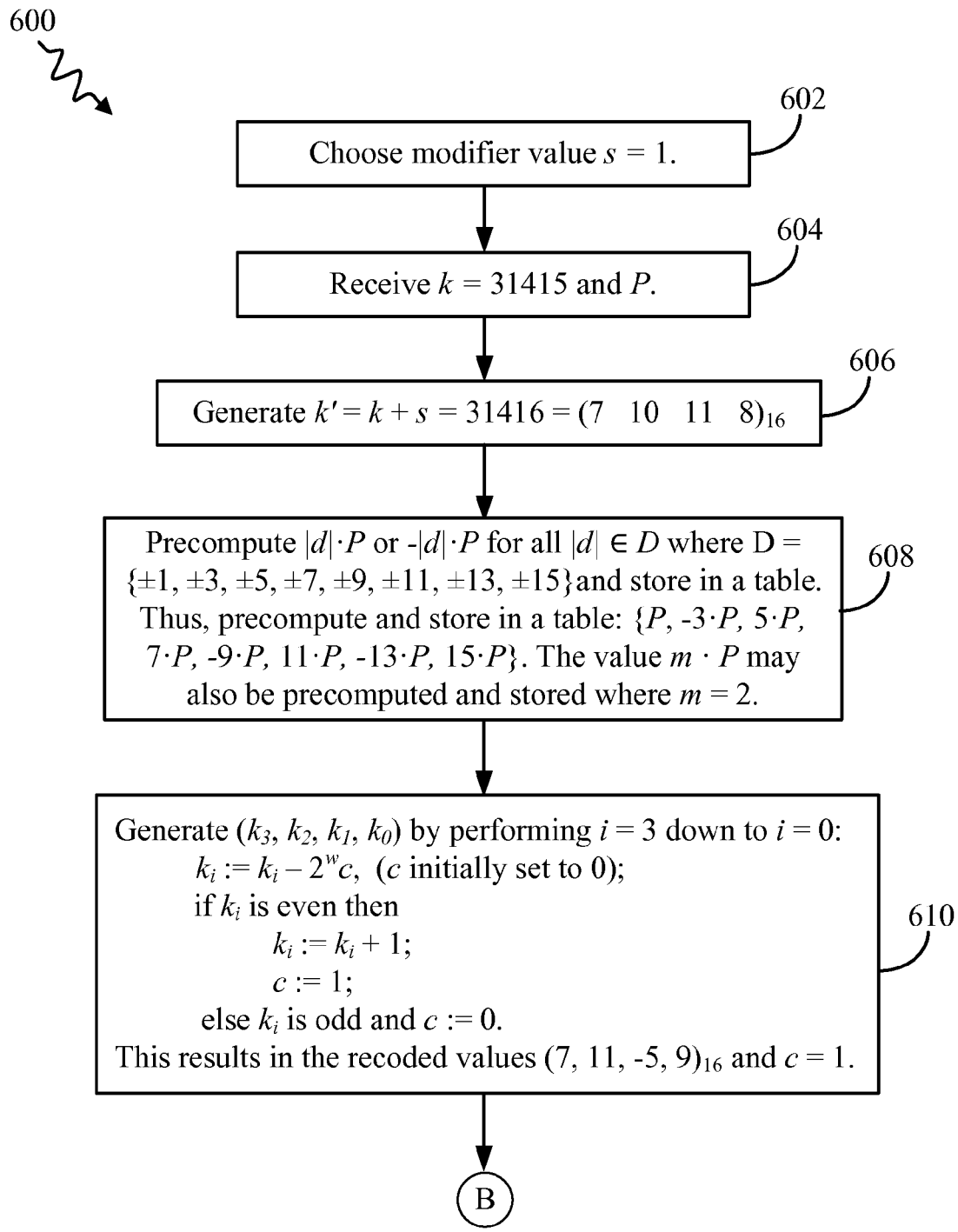
FIGS. 6A and 6B illustrate a first exemplary execution of the elliptic point scalar multiplication on sample number values for k, w, D, and s.
Figure 6B:
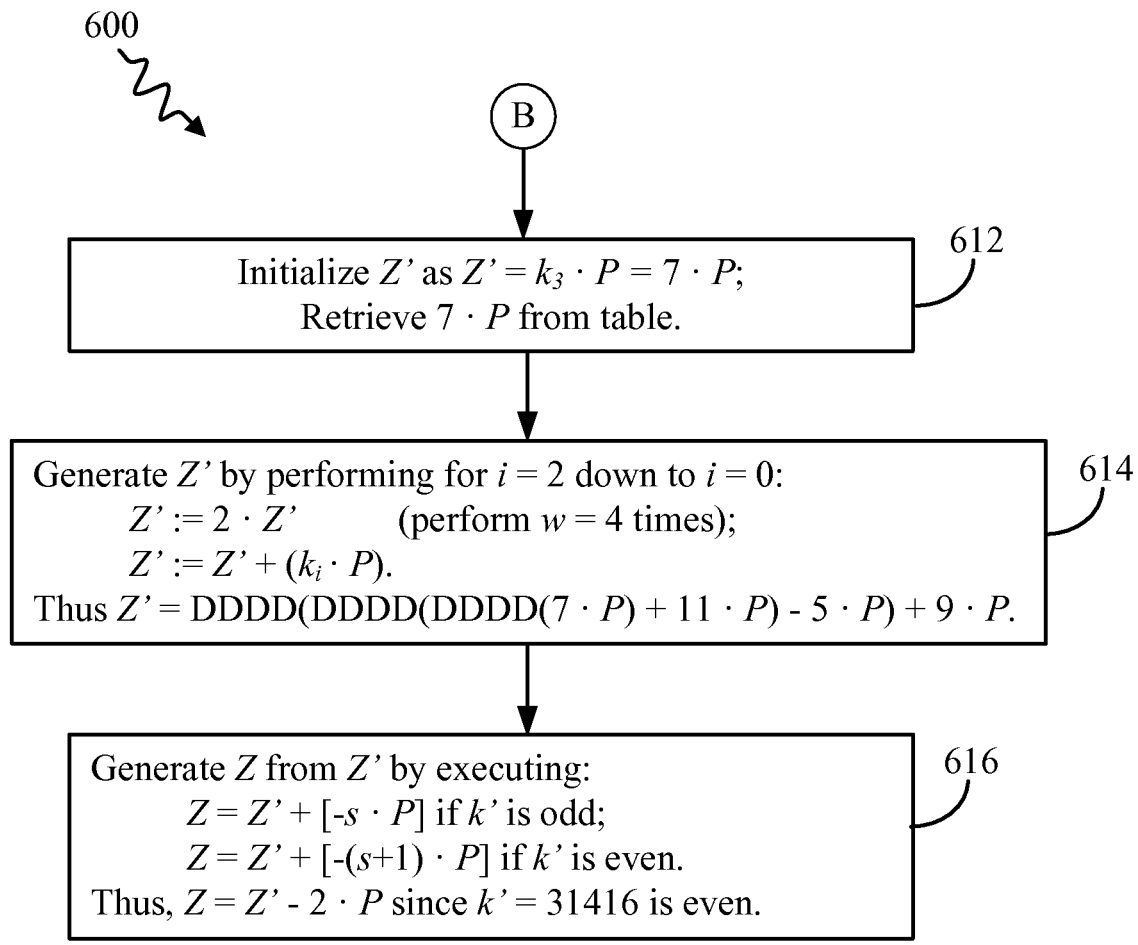

FIGS. 6A and 6B illustrate an exemplary execution of the aforementioned algorithms on sample number values for k, w, D, and s. For instance, in the illustrated example k=31415, w=4, D={±1, ±3, ±5, ±7, ±9, ±11, ±13, ±15}, and s=1. The process 600 may include first selecting 602 a modifier value s, which in this case equals 1. An input multiplier value k=31415 is received 604 along with a base value P. Next, an adjusted multiplier k' is generated 606 based on k'=k+s, and thus k'=31416 since s=1. In base 16 notation k'=(7 10 11 8)$_{16}$. Next, |d|·P or −|d|·P is computed and stored in a table for each value |d|∈D. Therefore, as just one example, the values (P, −3·P, 5·P, 7·P, −9·P, 11·P, −13·P, 15·P are precomputed 608 and stored in a table. The opposite signed values −P, 3·P, −5·P, −7·P, 9·P, −11·P, 13·P, −15·P may be easily obtained from the stored values. According to one aspect, a value m·P may also be precomputed and stored in the table where m=2. Other values in between −15·P and 15·P may also be precomputed and stored.

Then, the recoded digits ($k_3$, $k_2$, $k_1$, $k_0$) may be obtained by performing 610 for i=3 down to i=0 where initially c:=0:

$k_i := k_i - 2^w c$;
if $k_i$ is even:
   $k_i := k_i + 1$;
   c:=1;
else:
   c:=0.

This results in the recoded values (7, 11, −5, 9)$_{16}$ and carry c=1. Indeed 7*$16^3$+11*$16^2$−5*16+9−1=31416.

Referring to FIG. 6B, the intermediate scalar multiplication output Z' is initialized 612 to Z'=$k_3$·P, which equals 7·P.

The value 7·P may be obtained from the value stored in the table. Next, the intermediate scalar multiplication output Z' is calculated by performing 614 for i=2 down to i=0:

Z':=2·Z' (perform 4 times);
Z':=Z'+$k_i$·P.

Thus, in the illustrated example Z'=DDDD(DDDD(DDDD (7·P)+11·P)−5·P)+9·P, where the operation DDDD(x) means point double the operand x four (4) times. The values 11·P, −5·P, and 9·P may all be obtained directly from or derived from the values stored in the table. Finally, the scalar multiplication output Z may be obtained from Z' by executing 616:

Z=Z'+[−s·P] if k' is odd; or
Z=Z'+[−(s+1)·P] if k' is even.

Thus, in the illustrated example Z=Z'−2·P since k' is even (k'=31416) The value −2·P may also be derived from the value (e.g., 2·P) stored in the table.

In this fashion a fixed number and type of operations are performed to obtain the scalar output multiplication value Z, which includes DDDD then add, DDDD then add, DDDD then add, then subtract. That is, double 4 times the value 7·P then add 11·P, double 4 times the resulting value then add −5·P, double 4 times the resulting value then add 9·P, and then subtract 2·P (i.e., add −2·P).

Figure 7A:
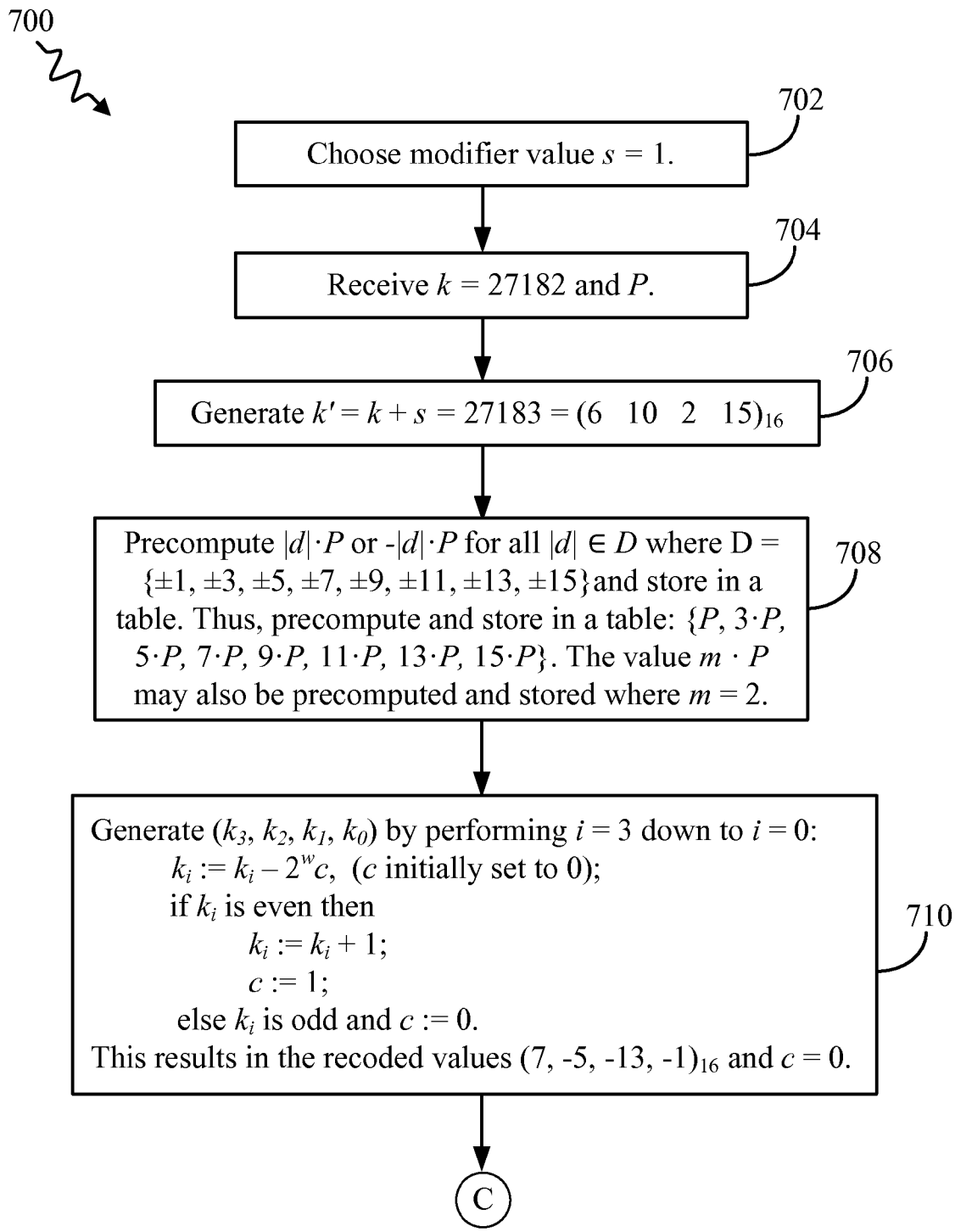
FIGS. 7A and 7B illustrate a second exemplary execution of the elliptic point scalar multiplication on sample number values for k, w, D, and s.
Figure 7B:
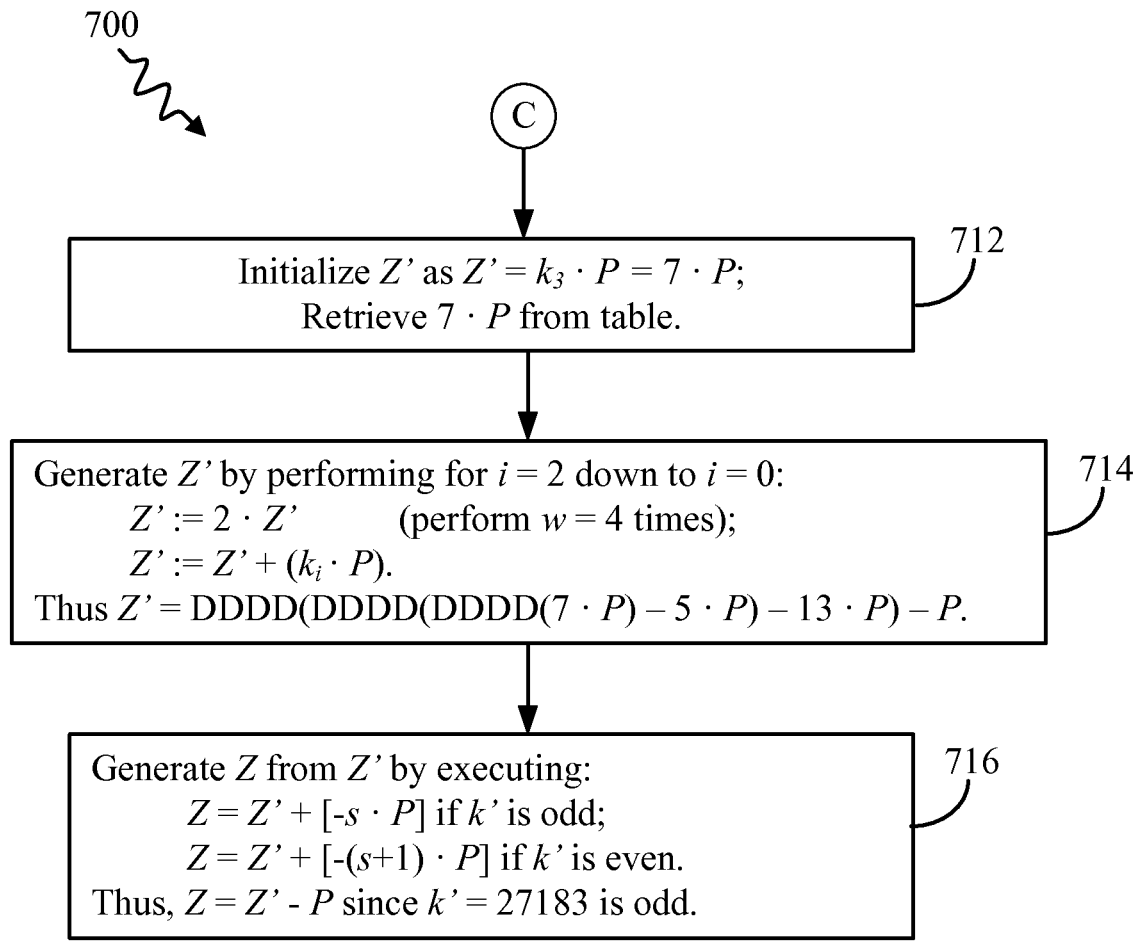

FIGS. 7A and 7B illustrate an exemplary execution of the aforementioned algorithms on sample number values for k, w, D, and s. For instance, in the illustrated example k=27182, w=4, D={±1, ±3, ±5, ±7, ±9, ±11, ±13, ±15}, and s=1. The process 700 may include first selecting 702 a modifier value s, which in this case equals 1. An input multiplier value k=27182 is received 704 along with a base value P. Next, an adjusted multiplier k' is generated 706 based on k'=k+s, and thus k'=27183 since s=1. In base 16 notation k'=(6 10 2 15)$_{16}$. Next, |d|·P or −|d|·P is computed and stored in a table for each value |d|∈D. Therefore, as just one example, the values {P, 3·P, 5·P, 7·P, 9·P, 11·P, 13·P, 15·P are precomputed 708 and stored in a table. The opposite signed values −P, −3·P, −5·P, −7·P, −9·P, −11·P, −13·P, −15·P may be easily obtained from the stored values. According to one aspect, a value m·P may also be precomputed and stored in the table where m=2. Other values in between −15·P and 15·P may also be precomputed and stored.

Then, the recoded digits ($k_3$, $k_2$, $k_1$, $k_0$) may be obtained by performing 710 for i=3 down to i=0 where initially c:=0:

$k_i$:=$k_i$−2$^w$c;
if $k_i$ is even:
$k_i$:=$k_i$+1;
c:=1;
else:
c:=0.

This results in the recoded values (7, −5, −13, −1)$_{16}$ and carry c=0. Indeed 7*16−5*16$^2$−13*16−1=27183.

Referring to FIG. 7B, the intermediate scalar multiplication output Z' is initialized 712 to Z'=$k_3$·P, which equals 7·P. The value 7·P may be obtained from the value stored in the table. Next, the intermediate scalar multiplication output Z' is calculated by performing 714 for i=2 down to i=0:

Z':=2·Z' (perform 4 times);
Z':=Z'+$k_i$·P.

Thus, in the illustrated example Z'=DDDD(DDDD(DDDD (7·P)−5·P)−13·P)−P. The values −5·P, −13·P, and −P may all be derived from the values stored in the table. Finally, the scalar multiplication output Z may be obtained from Z' by executing 616:

Z=Z'+[−s·P] if k' is odd; or
Z=Z'+[−(s+1)·P] if k' is even.

Thus, in the illustrated example Z=Z'−P since k' is odd (k'=27183) The value −P may also be derived from the value (e.g., P) stored in the table.

In this fashion a fixed number and type of operations are performed to obtain the scalar output multiplication value Z, which includes DDDD then add, DDDD then add, DDDD then add, then subtract. That is, double 4 times the value 7·P then add −5·P, double 4 times the resulting value then add −13·P, double 4 times the resulting value then add −P, and then subtract P (i.e., add −P).

Figure 8A:
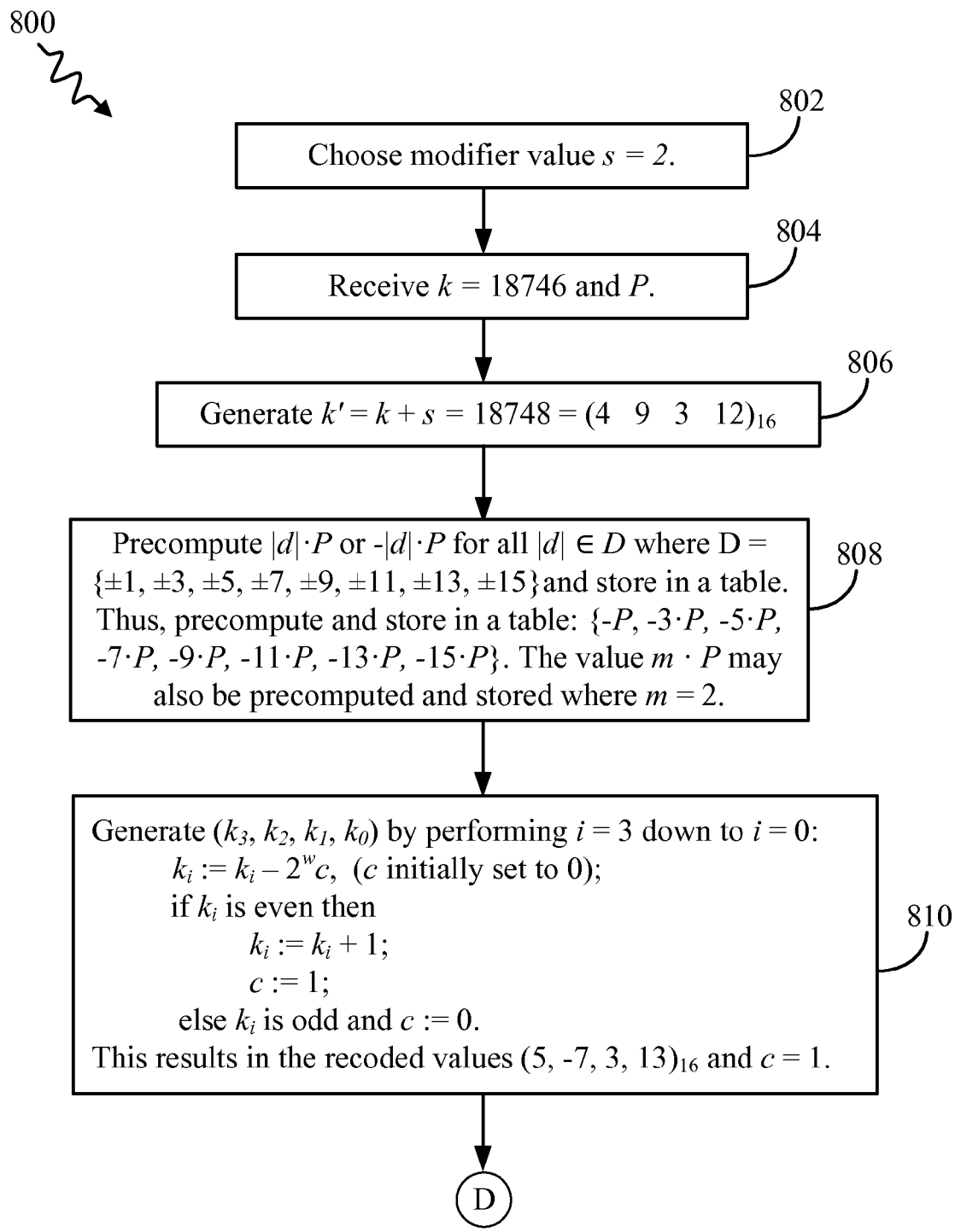
FIGS. 8A and 8B illustrate a third exemplary execution of the elliptic point scalar multiplication on sample number values for k, w, D, and s.
Figure 8B:
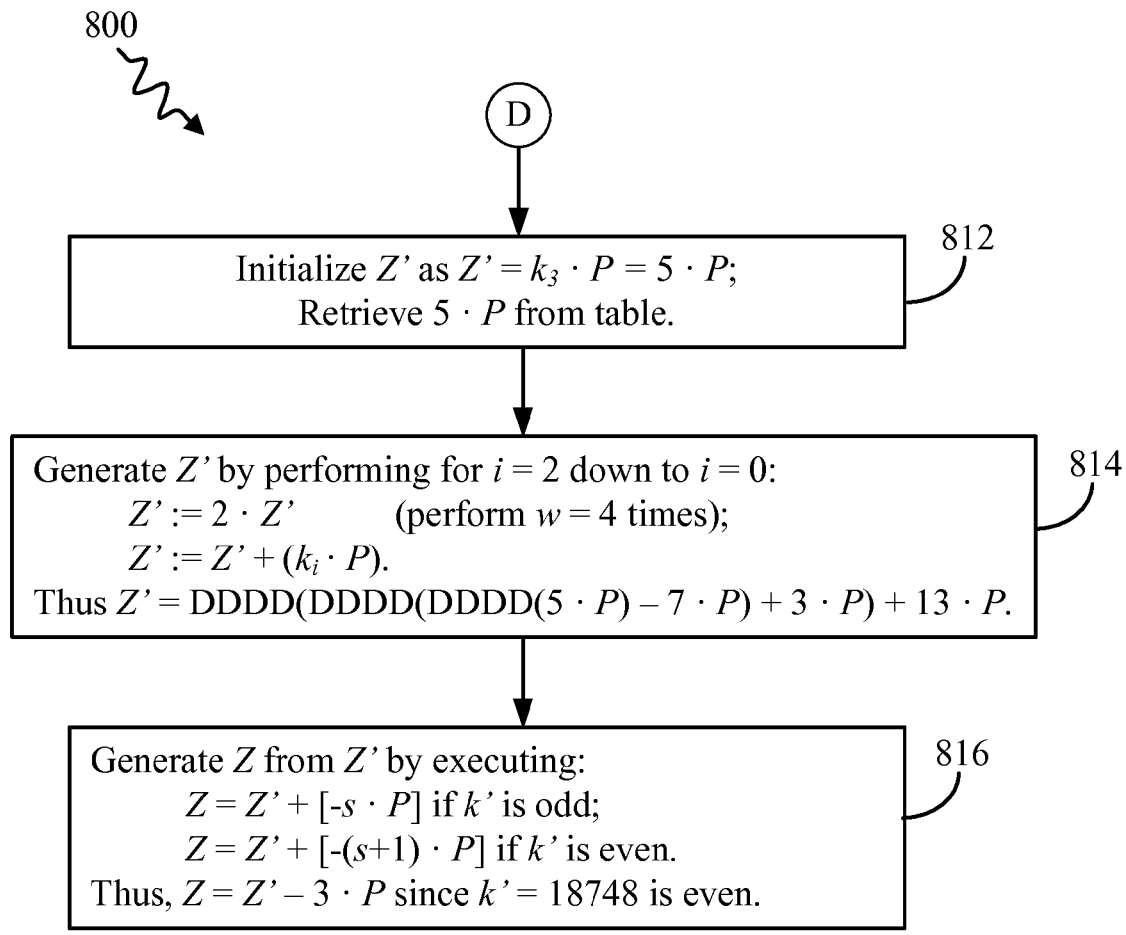

FIGS. 8A and 8B illustrate an exemplary execution of the aforementioned algorithms on sample number values for k, w, D, and s. For instance, in the illustrated example k=18746, w=4, D={±1, ±3, ±5, ±7, ±9, ±11, ±13, −15}, and s=2. The process 800 may include first selecting 802 a modifier value s, which in this case equals 2. An input multiplier value k=18746 is received 804 along with a base value P. Next, an adjusted multiplier k' is generated 806 based on k'=k+s, and thus k'=18748 since s=2. In base 16 notation k'=(4 9 3 12)$_{16}$. Next, |d|·P or −|d|·P is computed and stored in a table for each value |d|∈D. Therefore, as just one example, the values {−P, −3·P, −5·P, −7·P, −9·P, −11·P, −13·P, −15·P are precomputed 808 and stored in a table. The opposite signed values P, 3·P, 5·P, 7·P, 9·P, 11·P, 13·P, 15·P may be easily obtained from the stored values. According to one aspect, a value m·P may also be precomputed and stored in the table where m=2. Other values in between −15·P and 15·P may also be precomputed and stored.

Then, the recoded digits ($k_3$, $k_2$, $k_1$, $k_0$) may be obtained by performing 810 for i=3 down to i=0 where initially c:=0:

$k_i$:=$k_i$−2$^w$c;
if $k_i$ is even:
$k_i$:=$k_i$+1;
c:=1;
else:
c:=0.

This results in the recoded values (5, −7, 3, 13)$_{16}$ and carry c=1. Indeed 5*16$^3$−7*16$^2$+3*16+13=18749.

Referring to FIG. 8B, the intermediate scalar multiplication output Z' is initialized 812 to Z'=$k_3$·P, which equals 5·P. The value 5·P may be derived from the value (−5·P) stored in the table. Next, the intermediate scalar multiplication output Z' is calculated by performing 814 for i=2 down to i=0:

Z':=2·Z' (perform 4 times);
Z':=Z'+$k_i$·P.

Thus, in the illustrated example Z'=DDDD(DDDD(DDDD (5·P)−7·P)+3·P)+13·P. The values −7·P, 3·P, and 13·P may all be obtained from or derived from the values stored in the table. Finally, the scalar multiplication output Z may be obtained from Z' by executing 616:

Z=Z'+[−s·P] if k' is odd; or
Z=Z'+[−(s+1)·P] if k' is even.

Thus, in the illustrated example Z=Z'−3·P since k' is odd (k'=18748) The value −3·P may also be obtained from the value stored in the table.

In this fashion a fixed number and type of operations are performed to obtain the scalar output multiplication value Z, which includes DDDD then add, DDDD then add, DDDD then add, then subtract. That is, double 4 times the value 5·P then add −7·P, double 4 times the resulting value then add 3·P, double 4 times the resulting value then add 13·P, and then subtract 3·P (i.e., add −3·P).

Figure 9:
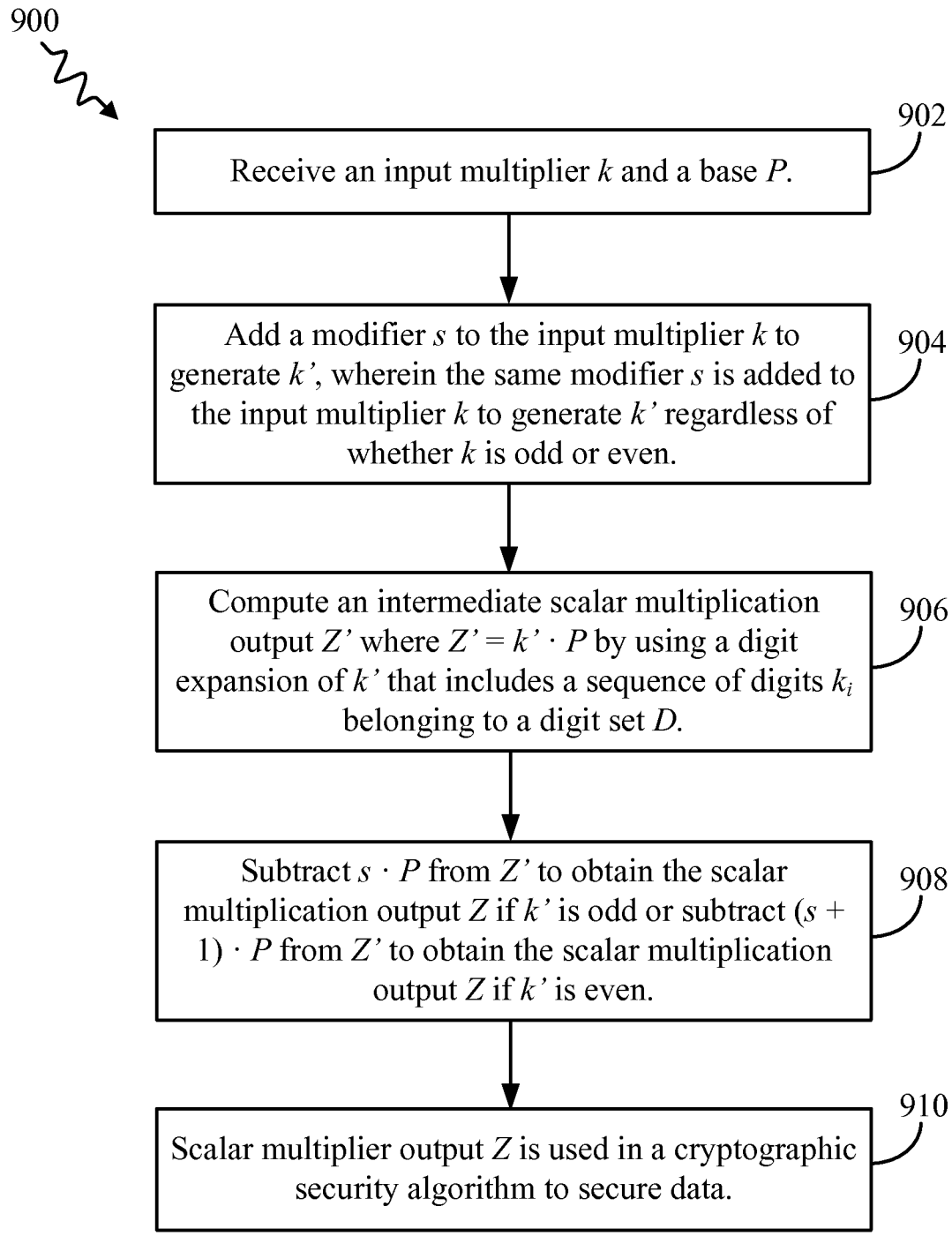
FIG. 9 illustrates a flow diagram of a method that may be executed at a processing circuit.

FIG. 9 illustrates a flow diagram of a method 900 that may be executed at a processing circuit according to one aspect of the disclosure. First, an input multiplier k and a base P is received 902. Then, a modifier s is added to the input multiplier k to generate k', where the same modifier s is added to the input multiplier k to generate k' regardless of whether k is odd or even 904. Next, an intermediate scalar multiplication output Z' is computed where Z'=k'·P by using a digit expansion of k' that includes a sequence of digits $k_i$ belonging to a digit set D 906. Then, s·P is subtracted from Z' to obtain the scalar multiplication output Z if k' is odd or (s+1)·P is subtracted from Z' to obtain the scalar multiplication output Z if k' is even 908. The scalar multiplier output Z may be used in a cryptographic security algorithm to secure data 910.

Figure 10:
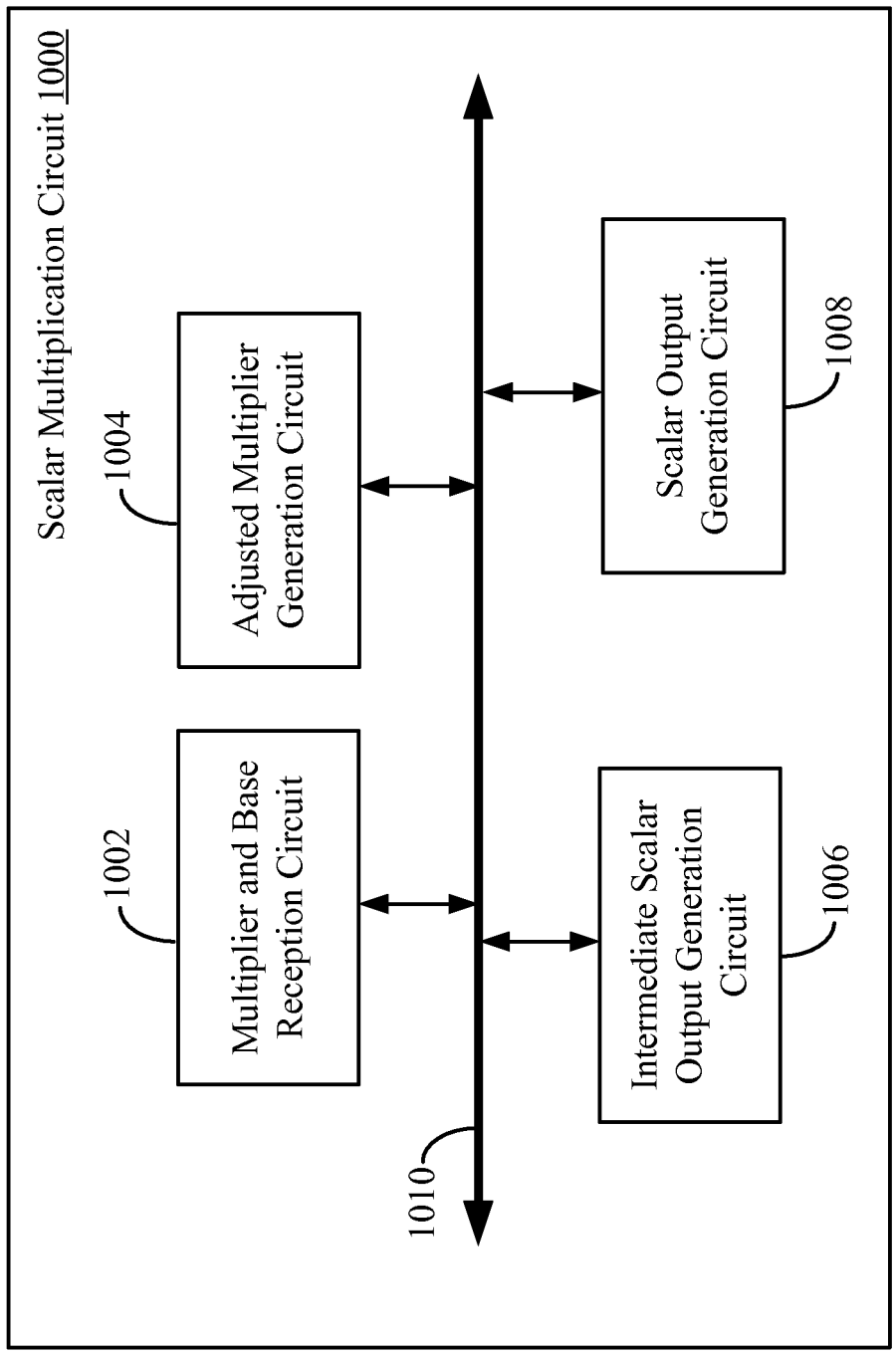
FIG. 10 illustrates a schematic block diagram of an exemplary scalar multiplication circuit.

FIG. 10 illustrates a schematic block diagram of an exemplary scalar multiplication circuit 1000 according to one aspect of the disclosure. The scalar multiplication circuit 1000 may include a multiplier k and base P reception circuit 1002, an adjusted multiplier k' generation circuit 1004, an intermediate scalar output generation circuit 1006, and a scalar output generation circuit 1008. The one or more circuit components 1002, 1004, 1006, 1008 may be communicatively coupled to one another, for example, through a communication bus 1010.

The multiplier k and base P reception circuit 1002 is a circuit that may be hardwired and specifically designed to receive an input multiplier k and a base P. Thus, the multiplier k and base P reception circuit 1002 may serve as one example of a means for receiving an input multiplier k and a base P. Similarly, the adjusted multiplier generation circuit 1004 is a circuit that may be hardwire and specifically designed to add a modifier s to the input multiplier k to generate k' regardless of whether k is odd or even. Thus, the adjusted multiplier generation circuit 1004 may serve as one example of a means for adding a modifier s to the input multiplier k to generate k' regardless of whether k is odd or even.

The intermediate scalar output generation circuit 1006 is a circuit that may be hardwired and specifically designed to compute an intermediate scalar multiplication output Z' where Z'=k'·P by using a digit expansion of k' that includes a sequence of digits $k_i$ belonging to a digit set D. Thus, the intermediate scalar output generation circuit 1006 is one example of a means for computing an intermediate scalar multiplication output Z' where Z'=k'·P by using a digit expansion of k' that includes a sequence of digits $k_i$ belonging to a digit set D. The scalar output generation circuit 1008 is a circuit that may be hardwired and specifically designed to subtract s·P from Z' to obtain the scalar multiplication output Z if k' is odd or subtract (s+1)·P from Z' to obtain the scalar multiplication output Z if k' is even. Thus, the scalar output generation circuit 1008 is one example of a means for subtracting s·P from Z' to obtain the scalar multiplication output Z if k' is odd or subtracting (s+1)·P from Z' to obtain the scalar multiplication output Z if k' is even.

One or more of the components, steps, features, and/or functions illustrated in FIGS. 1, 2, 3, 4, 5, 6, 7, 8, 9, and/or 10 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, and/or 10 may be configured to perform one or more of the methods, features, or steps described in FIGS. 3, 4A, 4B, 5, 6A, 6B, 7A, 7B, 8A, and/or 8B. The algorithms described herein may also be efficiently implemented in software and/or embedded in hardware.

Moreover, in one aspect of the disclosure, the processing circuit 102 illustrated in FIG. 1 may be a specialized processor (e.g., an application specific integrated circuit (e.g., ASIC)) that is specifically designed and/or hard-wired to perform the algorithms, methods, and/or steps described in FIGS. 3, 4A, 4B, 5, 6A, 6B, 7A, 7B, 8A, and/or 8B and related text. Thus, such a specialized processor (e.g., ASIC) may be one example of a means for executing the algorithms, methods, and/or steps described in FIGS. 3, 4A, 4B, 5, 6A, 6B, 7A, 7B, 8A, and/or 8B.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An electronic device comprising:
a memory circuit; and
a processing circuit communicatively coupled to the memory circuit, the processing circuit adapted to compute a scalar multiplication output Z where Z=k·P by:
receive an input multiplier k and a base P;
add a modifier s to the input multiplier k to generate k', wherein the same modifier s is added to the input multiplier k to generate k' regardless of whether k is odd or even;
compute an intermediate scalar multiplication output Z' where Z'=k'·P by using a digit expansion of k' that includes a sequence of digits $k_i$ belonging to a digit set D; and
subtract s·P from Z' to obtain the scalar multiplication output Z if k' is odd or subtract (s+1)·P from Z' to obtain the scalar multiplication output Z if k' is even; and
wherein the scalar multiplier output Z is used in a cryptographic security algorithm to secure data.

2. The electronic device of claim 1, wherein the digit expansion of k' is based on $k'=\Sigma_{i=0}^{l} k_i 2^{wi}-c$, and the sequence of digits $k_i$ are from the digit set D={±1, ±3, ±5, ..., ±$2^w$−1}, w is an integer value greater than or equal to one (1), and c equals 0 or 1.

3. The electronic device of claim 2, wherein the modifier s equals one (1) or two (2).

4. The electronic device of claim 1, wherein compute the intermediate scalar multiplication output Z' includes:
initialize a carry value c equal to zero (0);
determine, for a window length value w equal to or greater than one (1), a digit sequence ($k_l, k_{l-1}, \ldots, k_1, k_0$) by performing for all integer values i=l down to i=0 operations:
$k_i := k_i - 2^w c$;
if $k_i$ is even:
$k_i := k_i + 1$;
c := 1;
else:
c := 0.

5. The electronic device of claim 4, wherein compute the intermediate scalar multiplication output Z' further includes one of:
initialize Z' as Z'=$k_l$·P; and
perform, for i=l−1 down to i=0, operations:
Z'=2·Z' a number of times equal to w;
Z'=Z'+$k_i$·P; or
initialize Z' as Z'=0; and
perform, for i=l down to i=0, operations:
Z'=2·Z' a number of times equal to w;
Z'=Z'+$k_i$·P.

6. The electronic device of claim 5, wherein the processing circuit is further adapted to:
precompute at least one of a plurality of values d·P and/or −d·P for all values |d| where |d|∈D; and
store the precomputed plurality of values d·P and/or −d·P in the memory circuit.

7. The electronic device of claim 6, wherein Z'=Z'+$k_i$·P is performed by retrieving $k_i$·P from the precomputed plurality of values d·P and/or −d·P stored in the memory circuit.

8. The electronic device of claim 1, wherein a digit set D includes a plurality of integer values {$d_0, d_1, \ldots, d_n$}, and the processing circuit is further adapted to:
precompute and store a plurality of values $d_i$·P for i=0 to i=n.

9. The electronic device of claim 8, wherein the processing circuit is further adapted to:
precompute and store m·P for at least one integer intermediate value m where m is greater than a smallest value in the digit set D and less than a greatest value in the digit set D, and wherein the modifier s and s+1 are both in the set {$d_0, d_1, \ldots, d_n$}∪{m}.

10. The electronic device of claim 1, wherein compute the intermediate scalar multiplication output Z' includes:
initialize a carry value c equal to zero (0); and
determine, for a window length value w equal to or greater than one (1), a digit sequence ($k_l, k_{l-1}, \ldots, k_1, k_0$) by performing for all integer values i=l down to i=0 operations:
$k_i := k_i - 2^w c$;
c := 1−LSB($k_i$);
$k_i := k_i + c$.

11. A method for securing data in an electronic device by computing a scalar multiplication output Z where Z=k·P, the method comprising:
receiving an input multiplier k and a base P;
adding, via a processing circuit, a modifier s to the input multiplier k to generate k', wherein the same modifier s is added to the input multiplier k to generate k' regardless of whether k is odd or even;

computing, via the processing circuit, an intermediate scalar multiplication output Z' where Z'=k'·P by using a digit expansion of k' that includes a sequence of digits $k_i$ belonging to a digit set D; and subtracting, via the processing circuit, s·P from Z' to obtain the scalar multiplication output Z if k' is odd or subtracting (s+1)·P from Z' to obtain the scalar multiplication output Z if k' is even; and wherein the scalar multiplier output Z is configured to be used in a cryptographic security algorithm to secure the data.

12. The method of claim 11, wherein the digit expansion of k' is based on $k'=\Sigma_{i=0}^{l}k_i 2^{wi}-c$, and the sequence of digits $k_i$ are from the digit set $D=\{\pm1, \pm3, \pm5, \ldots, \pm2^w-1\}$, w is an integer value greater than or equal to one (1), and c equals 0 or 1.

13. The method of claim 12, wherein the modifier s equals one (1) or two (2).

14. The method of claim 11, wherein computing the intermediate scalar multiplication output Z' includes:

initializing a carry value c equal to zero (0);

determining, for a window length value w equal to or greater than one (1), a digit sequence ($k_l, k_{l-1}, \ldots, k_1, k_0$) by performing for all integer values i=l down to i=0 operations:

$k_i:=k_i-2^w c$;

if $k_i$ is even:
  $k_i:=k_i+1$;
  c:=1;
else:
  c:=0.

15. The method of claim 14, wherein computing the intermediate scalar multiplication output Z' further includes one of:

initializing Z' as $Z'=k_l \cdot P$; and
performing, for i=l−1 down to i=0, operations:
  Z'=2·Z' a number of times equal to w;
  $Z'=Z'+k_i \cdot P$; or initializing Z' as Z'=0; and
performing, for i=l down to i=0, operations:
  Z'=2·Z' a number of times equal to w;
  $Z'=Z'+k_i \cdot P$.

16. The method of claim 15, wherein the method further comprises:

precomputing at least one of a plurality of values d·P and/or −d·P for all values |d| where |d| ∈D; and storing the precomputed plurality of values d·P and/or −d·P in a memory circuit.

17. The method of claim 16, wherein $Z'=Z'+k_i \cdot P$ is performed by:

retrieving $k_i \cdot P$ from the precomputed plurality of values d·P and/or −d·P stored in the memory circuit.

18. The method of claim 11, wherein a digit set D includes a plurality of integer values $\{d_0, d_1, \ldots, d_n\}$, and the method further comprises:

precomputing and storing a plurality of values $d_i \cdot P$ for i=0 to i=n.

19. The method of claim 18, further comprising:

precomputing and storing m·P for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$.

20. The method of claim 11, wherein computing the intermediate scalar multiplication output Z' includes:

initializing a carry value c equal to zero (0); and determining, for a window length value w equal to or greater than one (1), a digit sequence ($k_l, k_{l-1}, \ldots, k_1, k_0$) by performing for all integer values i=l down to i=0 operations:

$k_i:=k_i-2^w c$;
c:=1−LSB($k_i$);
$k_i=k_i+c$.

21. An electronic device adapted to secure data in an electronic device by computing a scalar multiplication output Z where Z=k·P, the electronic device comprising:

means for receiving an input multiplier k and a base P;

means for adding a modifier s to the input multiplier k to generate k', wherein the same modifier s is added to the input multiplier k to generate k' regardless of whether k is odd or even;

means for computing an intermediate scalar multiplication output Z' where Z'=k'·P by using a digit expansion of k' that includes a sequence of digits $k_i$ belonging to a digit set D; and means for subtracting s·P from Z' to obtain the scalar multiplication output Z if k' is odd or means for subtracting (s+1)·P from Z' to obtain the scalar multiplication output Z if k' is even; and wherein the scalar multiplier output Z is configured to be used in a cryptographic security algorithm to secure the data.

22. The electronic device of claim 21, wherein the digit expansion of k' is based on $k'=\Sigma_{i=0}^{l}k_i 2^{wi}-c$, and the sequence of digits $k_i$ are from the digit set $D=\{\pm1, \pm3, \pm5, \ldots, \pm2^w-1\}$, w is an integer value greater than or equal to one (1), and c equals 0 or 1.

23. The electronic device of claim 22, wherein the modifier s equals one (1) or two (2).

24. The electronic device of claim 21, wherein the means for computing the intermediate scalar multiplication output Z' includes:

means for initializing a carry value c equal to zero (0);

means for determining, for a window length value w equal to or greater than one (1), a digit sequence ($k_l, k_{l-1}, \ldots, k_1, k_0$) by performing for all integer values i=l down to i=0 operations:

$k_i:=k_i-2^w c$;
if $k_i$ is even:
  $k_i:=k_i+1$;
  c:=1;
else:
  c:=0.

25. The electronic device of claim 21, wherein the means for computing the intermediate scalar multiplication output Z' further includes one of:

means for initializing Z' as $Z'=k_l \cdot P$; and
means for performing, for i=l−1 down to i=0, operations:
  Z'=2·Z' a number of times equal to w;
  $Z'=Z'+k_i \cdot P$; or means for initializing Z' as Z'=0; and
means for performing, for i=l down to i=0, operations:
  Z'=2·Z' a number of times equal to w;
  $Z'=Z'+k_i \cdot P$.

26. The electronic device of claim 25, further comprising:

means for precomputing at least one of a plurality of values d·P and/or −d·P for all values |d| where |d|∈D; and means for storing the precomputed plurality of values d·P and/or −d·P in a memory circuit.

27. The electronic device of claim 26, wherein $Z'=Z'+k_i \cdot P$ is performed by:

means for retrieving $k_i \cdot P$ from the precomputed plurality of values $d \cdot P$ and/or $-d \cdot P$ stored in the memory circuit.

28. The electronic device of claim 21, wherein a digit set D includes a plurality of integer values $\{d_0, d_1, \ldots, d_n\}$, and the electronic device further comprises:

means for precomputing and means for storing a plurality of values $d_i \cdot P$ for $i=0$ to $i=n$.

29. The electronic device of claim 28, further comprising:

means for precomputing and means for storing $m \cdot P$ for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$.

30. The electronic device of claim 21, wherein the means for computing the intermediate scalar multiplication output Z' includes:

means for initializing a carry value c equal to zero (0); and
means for determining, for a window length value w equal to or greater than one (1), a digit sequence ($k_l$, $k_{l-1}$, ..., $k_1$, $k_0$) by performing for all integer values $i=l$ down to $i=0$ operations:
$k_i := k_i - 2^w c$;
$c := 1 - LSB(k_i)$;
$k_i = k_i + c$.

31. A non-transitory computer-readable storage medium adapted to store one or more instructions for computing a scalar multiplication output Z where $Z = k \cdot P$, the instructions which when executed by at least one processor causes the processor to:

receive an input multiplier k and a base P;
add a modifier s to the input multiplier k to generate k', wherein the same modifier s is added to the input multiplier k to generate k' regardless of whether k is odd or even;
compute an intermediate scalar multiplication output Z' where $Z' = k' \cdot P$ by using a digit expansion of k' that includes a sequence of digits $k_i$ belonging to a digit set D; and
subtract $s \cdot P$ from Z' to obtain the scalar multiplication output Z if k' is odd or subtract $(s+1) \cdot P$ from Z' to obtain the scalar multiplication output Z if k' is even; and
wherein the scalar multiplier output Z is used in a cryptographic security algorithm to secure data.

32. The computer-readable storage medium of claim 31, wherein the digit expansion of k' is based on $k' = \sum_{i=0}^{l} k_i 2^{wi} - c$, and the sequence of digits $k_i$ are from the digit set $D = \{\pm 1, \pm 3, \pm 5, \ldots, \pm 2^w - 1\}$, w is an integer value greater than or equal to one (1), and c equals 0 or 1.

33. The computer-readable storage medium of claim 32, wherein the modifier s equals one (1) or two (2).

34. The computer-readable storage medium of claim 31, wherein the instructions for causing the processor to compute the intermediate scalar multiplication output Z' further include instructions for causing the processor to:

initialize a carry value c equal to zero (0);
determine, for a window length value w equal to or greater than one (1), a digit sequence ($k_l$, $k_{l-1}$, ..., $k_1$, $k_0$) by performing for all integer values $i=l$ down to $i=0$ operations:
$k_i := k_i - 2^w c$;
if $k_i$ is even:
$k_i := k_i + 1$;
$c := 1$;

else:
$c := 0$.

35. The computer-readable storage medium of claim 34, wherein the instructions for causing the processor to compute the intermediate scalar multiplication output Z' further include instructions for causing the processor to one of:

initialize Z' as $Z' = k_l \cdot P$; and
perform, for $i=l-1$ down to $i=0$, operations:
$Z' = 2 \cdot Z'$ a number of times equal to w;
$Z' = Z' + k_i \cdot P$; or
initialize Z' as $Z' = 0$; and
perform, for $i=l$ down to $i=0$, operations:
$Z' = 2 \cdot Z'$ a number of times equal to w;
$Z' = Z' + k_i \cdot P$.

36. The computer-readable storage medium of claim 35, the instructions which when executed by the at least one processor further causes the processor to:

precompute at least one of a plurality of values $d \cdot P$ and/or $-d \cdot P$ for all values $|d|$ where $|d| \in D$; and
store the precomputed plurality of values $d \cdot P$ and/or $-d \cdot P$ in a memory circuit.

37. The computer-readable storage medium of claim 36, the instructions which when executed by the at least one processor further causes the processor to:

retrieve $k_i \cdot P$ from the precomputed plurality of values $d \cdot P$ and/or $-d \cdot P$ stored in the memory circuit to execute $Z' = Z' + k_i \cdot P$.

38. The computer-readable storage medium of claim 31, wherein a digit set D includes a plurality of integer values $\{d_0, d_1, \ldots, d_n\}$, and the instructions which when executed by the at least one processor further causes the processor to:

precompute and store a plurality of values $d_i \cdot P$ for $i=0$ to $i=n$.

39. The computer-readable storage medium of claim 38, wherein the instructions which when executed by the at least one processor further cause the processor to:

precompute and store $m \cdot P$ for at least one integer intermediate value m where m is greater than a smallest value in the digit set D and less than a greatest value in the digit set D, and wherein the modifier s and s+1 are both in the set $\{d_0, d_1, \ldots, d_n\} \cup \{m\}$.

40. The computer-readable storage medium of claim 31, wherein the instructions for causing the processor to compute the intermediate scalar multiplication output Z' further include instructions for causing the processor to:

initialize a carry value c equal to zero (0); and
determine, for a window length value w equal to or greater than one (1), a digit sequence ($k_l$, $k_{l-1}$, ..., $k_1$, $k_0$) by performing for all integer values $i=l$ down to $i=0$ operations:
$k_i := k_i - 2^w c$;
$c := 1 - LSB(k_i)$;
$k_i = k_i + c$.

41. An integrated circuit comprising:

a memory circuit; and
a processing circuit communicatively coupled to the memory circuit, the processing circuit adapted to compute a scalar multiplication output Z where $Z = k \cdot P$ by:
receive an input multiplier k and a base P;
add a modifier s to the input multiplier k to generate k', wherein the same modifier s is added to the input multiplier k to generate k' regardless of whether k is odd or even;
compute an intermediate scalar multiplication output Z' where $Z' = k' \cdot P$ by using a digit expansion of k' that includes a sequence of digits $k_i$ belonging to a digit set D; and subtract s·P from Z' to obtain the scalar multiplication output Z if k' is odd or subtract (s+1)·P from Z' to obtain the scalar multiplication output Z if k' is even; and wherein the scalar multiplier output Z is used in a cryptographic security algorithm to secure data.

42. The integrated circuit of claim 41, wherein the digit expansion of k' is based on $k'=\Sigma_{i=0}^{l}k_i 2^{wi}-c$, and the sequence of digits $k_i$ are from the digit set $D=\{\pm 1, \pm 3, \pm 5, \ldots, \pm 2^w-1\}$, w is an integer value greater than or equal to one (1), and c equals 0 or 1.

43. The integrated circuit of claim 42, wherein the modifier s equals one (1) or two (2).

44. The integrated circuit of claim 41, wherein compute the intermediate scalar multiplication output Z' includes:
initialize a carry value c equal to zero (0);
determine, for a window length value w equal to or greater than one (1), a digit sequence ($k_l$, $k_{l-1}$, ..., $k_1$, $k_0$) by performing for all integer values i=l down to i=0 operations:
$k_i:=k_i-2^w c$;
if $k_i$ is even:
  $k_i:=k_i+1$;
  c:=1;
else:
  c:=0.

45. The integrated circuit of claim 44, wherein compute the intermediate scalar multiplication output Z' further includes one of:
initialize Z' as $Z'=k_l \cdot P$; and
perform, for i=l−1 down to i=0, operations:
  $Z'=2\cdot Z'$ a number of times equal to w; and
  $Z'=Z'+k_i \cdot P$; or
initialize Z' as Z'=0; and
perform, for i=l down to i=0, operations:
  $Z'=2\cdot Z'$ a number of times equal to w;
  $Z'=Z'+k_i \cdot P$.

46. The integrated circuit of claim 45, wherein the processing circuit is further adapted to:
precompute at least one of a plurality of values d·P and/or −d·P for all values |d| where |d|∈D; and
store the precomputed plurality of values d·P and/or −d·P in the memory circuit.

47. The integrated circuit of claim 46, wherein $Z'=Z'+k_i \cdot P$ is performed by retrieving $k_i \cdot P$ from the precomputed plurality of values d·P and/or −d·P stored in the memory circuit.

48. The integrated circuit of claim 41, wherein a digit set D includes a plurality of integer values $\{d_0, d_1, \ldots, d_n\}$, and the processing circuit is further adapted to:
precompute and store a plurality of values $d_i \cdot P$ for i=0 to i=n.

49. The integrated circuit of claim 48, wherein the processing circuit is further adapted to:
precompute and store m·P for at least one integer intermediate value m where m is greater than a smallest value in the digit set D and less than a greatest value in the digit set D, and wherein the modifier s and s+1 are both in the set $\{d_0, d_1, \ldots, d_n\}\cup\{m\}$.

50. The integrated circuit of claim 41, wherein compute the intermediate scalar multiplication output Z' includes:
initialize a carry value c equal to zero (0); and
determine, for a window length value w equal to or greater than one (1), a digit sequence ($k_l$, $k_{l-1}$, ..., $k_1$, $k_0$) by performing for all integer values i=l down to i=0 operations:
$k_i:=k_i-2^w c$;
c:=1−LSB($k_i$);
$k_i=k_i+c$.

* * * * *